March 24, 1964

W. E. BRAINARD 3,125,796

MACHINE TOOL CONTROL SYSTEM

Filed May 13, 1960

INVENTOR.
Wallace E. Brainard
BY William C. Gleisner Jr.
Attorney

March 24, 1964

W. E. BRAINARD 3,125,796

MACHINE TOOL CONTROL SYSTEM

Filed May 13, 1960

INVENTOR.
Wallace E. Brainard
BY William C. Kleiner Jr.
Attorney

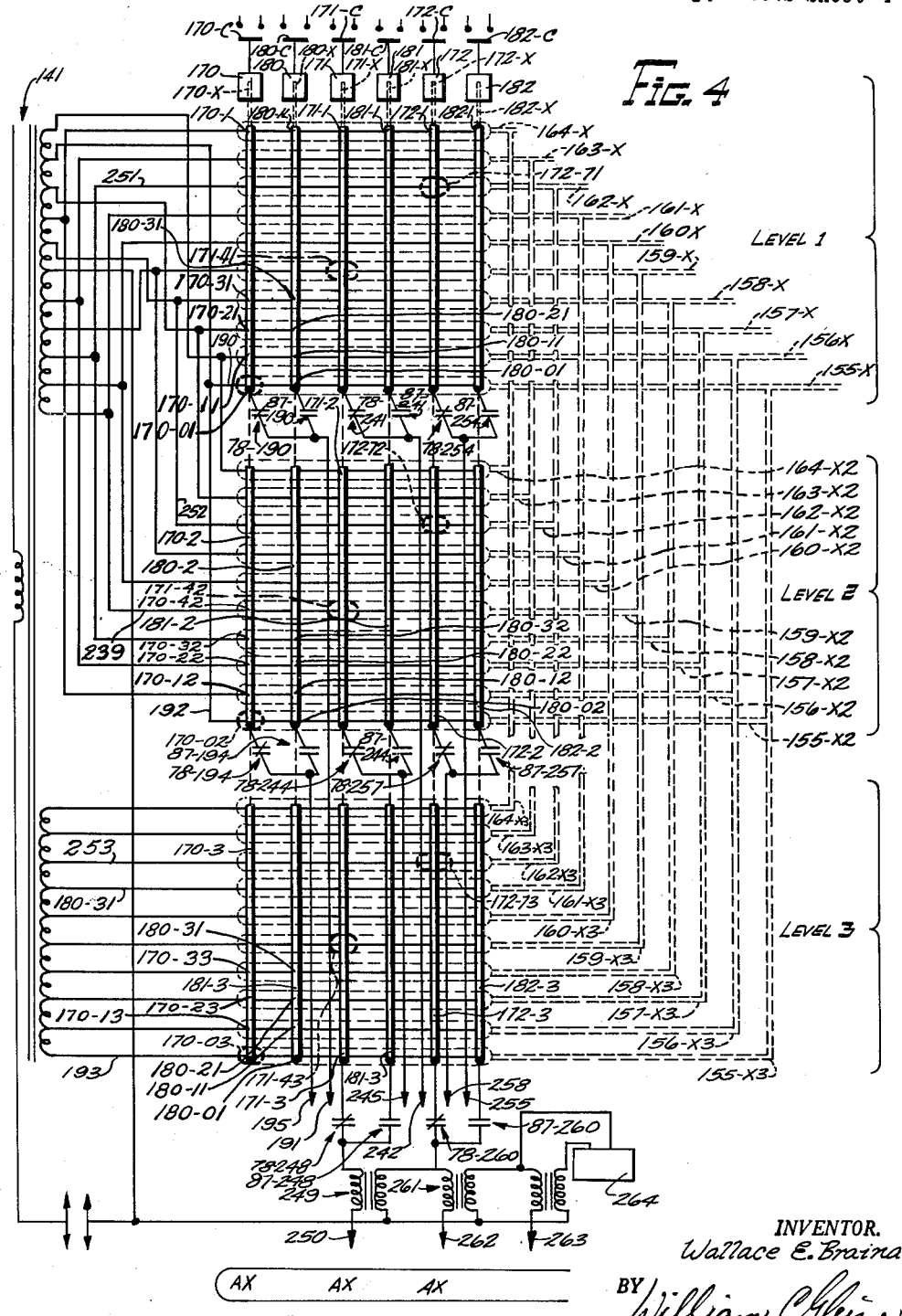

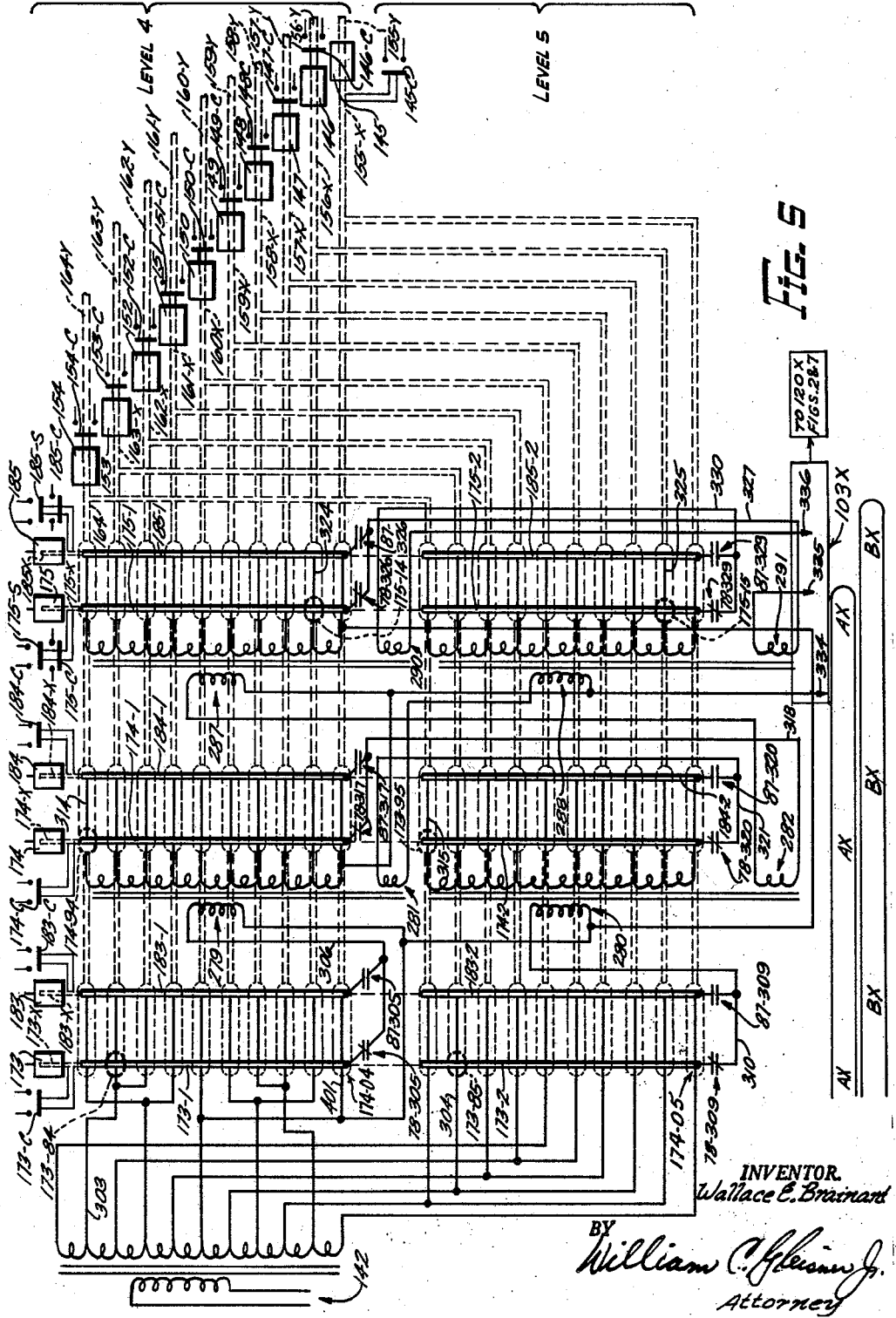

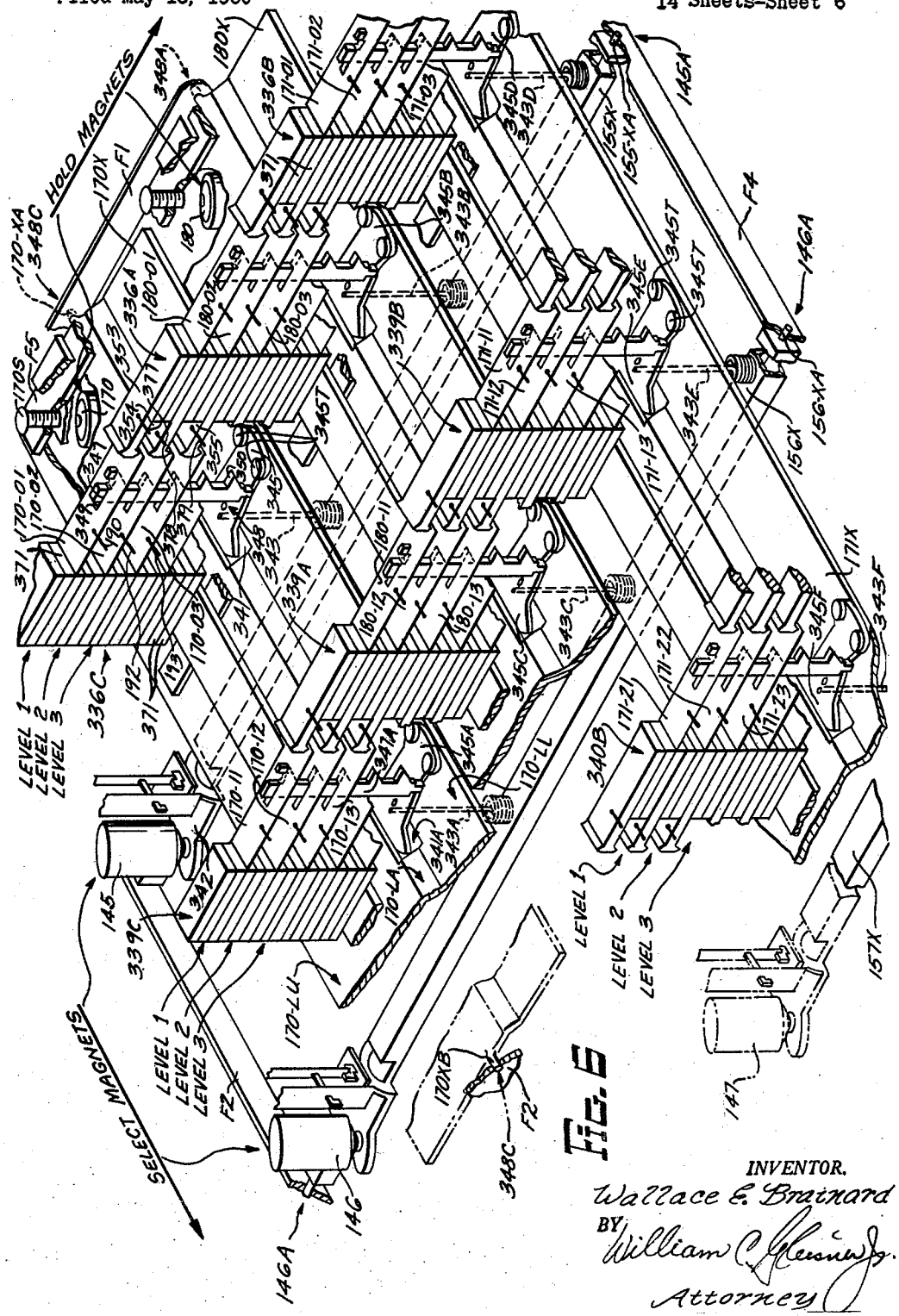

March 24, 1964 W. E. BRAINARD 3,125,796
MACHINE TOOL CONTROL SYSTEM
Filed May 13, 1960 14 Sheets-Sheet 7
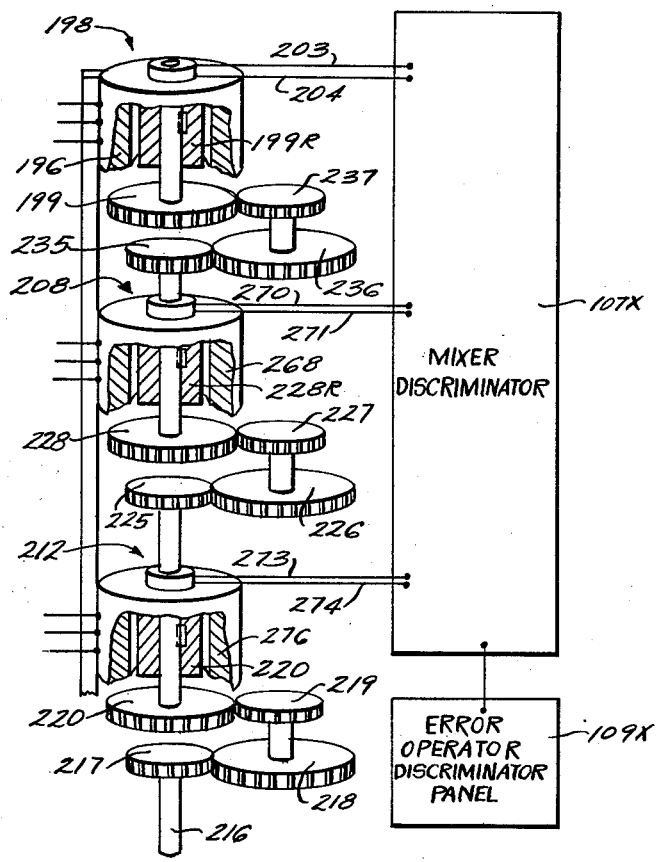
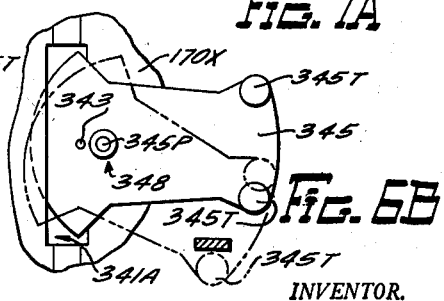
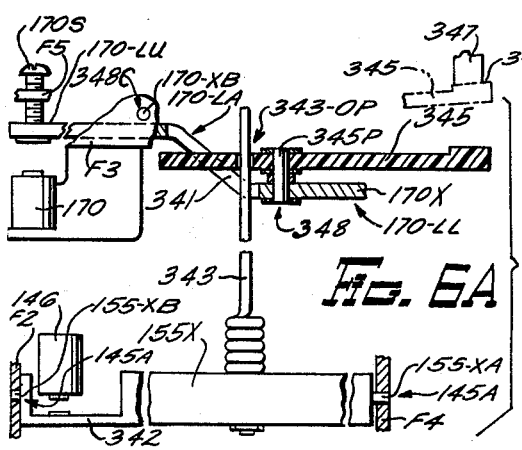
INVENTOR.
Wallace E. Brainard
BY William C. Gleisner Jr.
Attorney March 24, 1964 W. E. BRAINARD 3,125,796
MACHINE TOOL CONTROL SYSTEM
Filed May 13, 1960 14 Sheets-Sheet 8

INVENTOR.
BY Wallace E. Brainard
William C. Gleisner Jr.
Attorney

INVENTOR.
Wallace E. Brainard
BY William C. Gleisner Jr.
Attorney

March 24, 1964     W. E. BRAINARD     3,125,796

MACHINE TOOL CONTROL SYSTEM

Filed May 13, 1960     14 Sheets-Sheet 12

INVENTOR.
Wallace E. Brainard
BY
William C. Gleisner Jr.
Attorney

March 24, 1964 W. E. BRAINARD 3,125,796
MACHINE TOOL CONTROL SYSTEM
Filed May 13, 1960 14 Sheets-Sheet 13
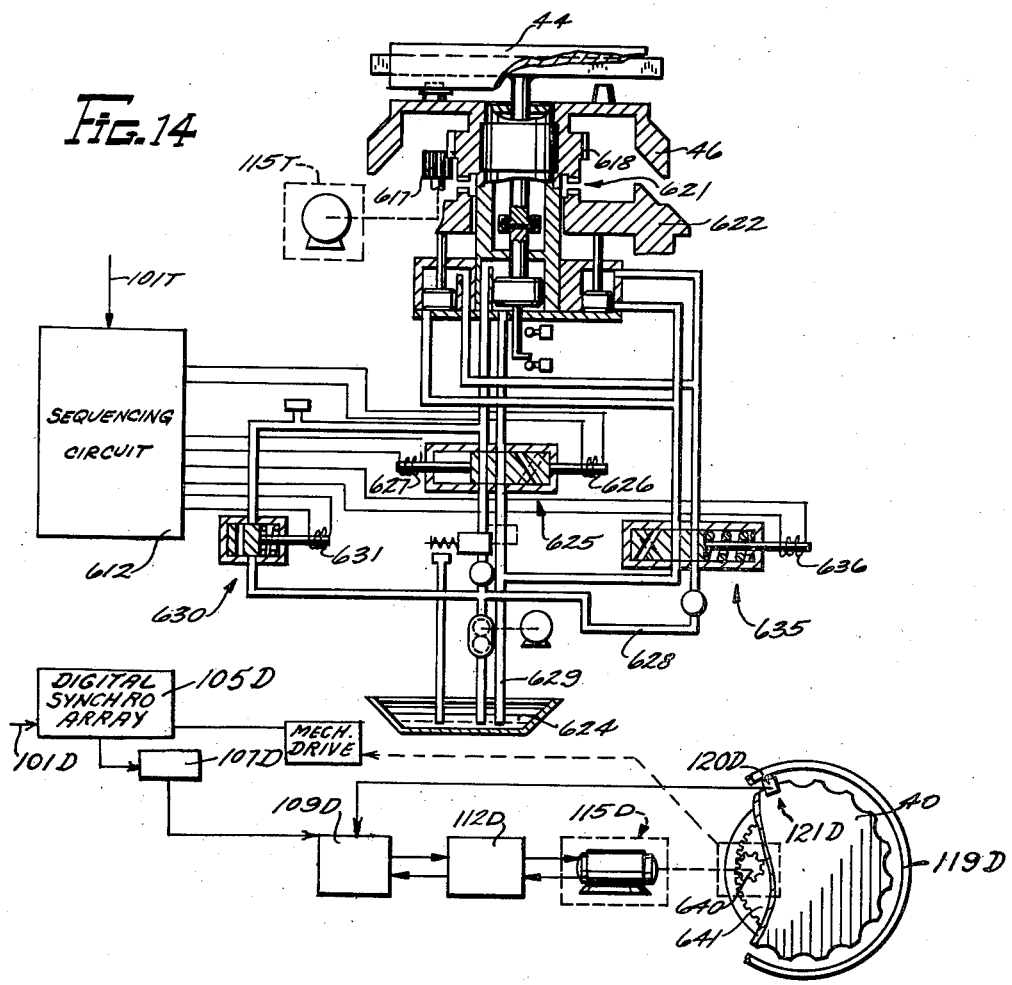
Fig. 14
Fig. 15
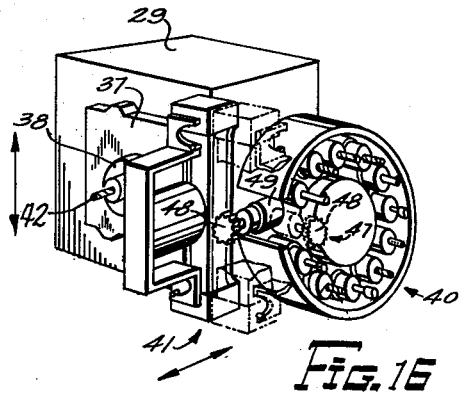
Fig. 16
INVENTOR.
Wallace E. Brainard
BY
William C. Gleisner Jr.
Attorney

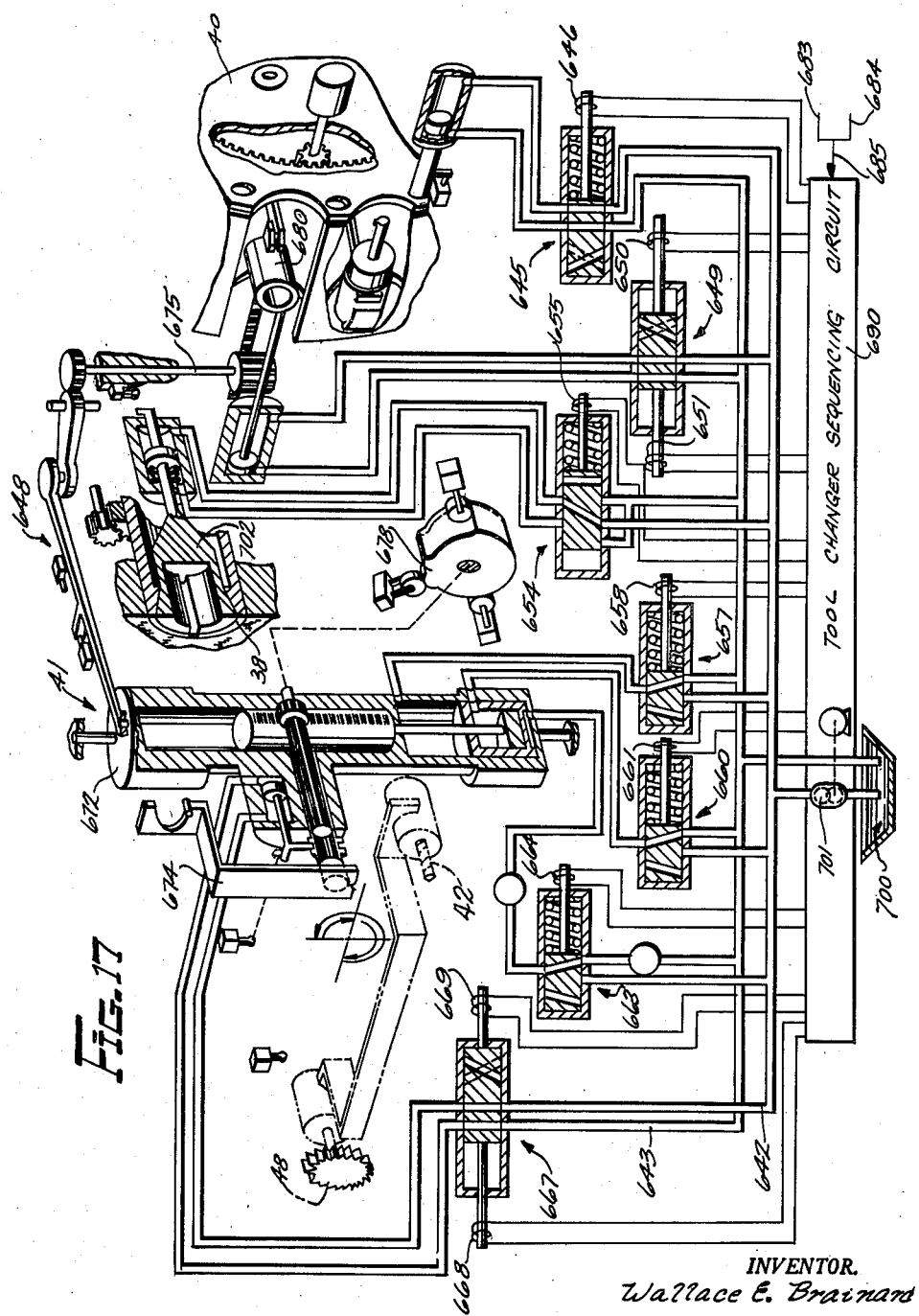

United States Patent Office 3,125,796
Patented Mar. 24, 1964

3,125,796
MACHINE TOOL CONTROL SYSTEM
Wallace E. Brainard, Milwaukee, Wis., assignor to Kearney & Trecker Corporation, West Allis, Wis., a corporation of Wisconsin
Filed May 13, 1960, Ser. No. 29,011
20 Claims. (Cl. 29—26)

This invention relates generally to machine tool control systems and more particularly to an improved control system provided with means for storing programmed data from a record of serial input information for controlling a preselected series of machine functions, as well as means for controlling machine functions simultaneously with the storage of additional programmed data from the record.

A general object of this invention is to provide an improved integrated tape control system for a machine tool capable of performing a plurality of different machine functions including changing tools as required, positioning movable work and tool supporting elements, and performing a predetermined sequence of machining operations.

Another object of the invention is to provide an improved data storage register for retaining programmed input information.

Another object of the invention is to provide improved means for storing different words of input information respectively adapted to initiate different machine functions in correspondingly different portions of a storage register.

Another object of the invention is to provide an improved dual storage register comprising a crossbar switch mechanism adapted to be selectively activated by serial input information from a tape carrying a coded program of machine movements.

Another object of the invention is to provide an improved dual storage register for a machine tool control system in which one register is connected to accept serial input information at the same time the other register is connected to provide a parallel read-out of previously stored information for simultaneously effecting a plurality of different preselected machine functions.

Another object of the invention is to provide improved means for controlling an improved servo operated positioning system for a machine tool incorporating an array of synchros for coarse positioning, in series with a lineal resolver for fine positioning; the final error signal from the lineal resolver being operatively connected to continuously activate a positioning servo for positively retaining a movable machine tool element in a preselected position.

A further object of the invention is to provide an improved data storage medium for a machine tool control system in which data stored in one portion of the storage medium is utilized to effect machine functions at the same time that data from a relatively slow speed transmitting source is being entered into another portion of the storage medium.

A further object of the invention is to provide a crossbar switch mechanism as a novel storage register for the tape control system of a machine tool.

A further object of the invention is to utilize a crossbar switch as a storage register for storing decimal input information, and for converting the information into an analogue, binary or decimal output according to the requirements of a machine function to be performed.

A further object of the invention is to provide improved means for facilitating a relatively continuous transfer of serial input information from a tape reader to one portion of a storage register, in a manner that machine functions may be effected in response to data stored in another portion of the storage register at the same time, with the portions of the storage register being alternately connectable to effect machine functions and to receive serial input information.

A further object of the invention is to provide an integrated control system for reading a programmed record of digital input information and sequencing the different words of information into correspondingly different portions of a storage register.

A still further object of the invention is to provide a novel positioning control system utilizing two different sources of input supply voltage to provide reference voltage signals for respectively activating a synchro array and a lineal resolver interconnected in series to sequentially provide a coarse and fine error signal for positioning a machine member.

A still further object of the invention is to provide an improved machine control system incorporating a plurality of error amplifiers respectively connected to dynamically maintain corresponding movable machine slides in preselected positions, at the same time that serial input command information is being accepted by the control system.

A still further object of the invention is to provide improved means for sequencing different words of command information into different portions of a crossbar switch comprising a storage register.

According to this invention, a machine tool having a bodily movable tool support and a cooperatively disposed selectively indexable work support is provided with an improved control system adapted to receive serial input information from a record disposed to provide numerical data in the form of a word comprising numerical information for each machine function to be performed. Serial input information from the record is operative to activate a decoding network having a decimal output that is, in turn, operative to preset different registers, for subsequent parallel read-out of information for effecting the various machine functions.

Storage of the decimal input information from the decoding network operates to preset a crossbar switch mechanism arranged in such a manner as to provide dual registers for each machine function to be performed. One of the crossbar registers associated with each machine function is automatically connectable to effect a particular function from previously stored information simultaneously with the storage of serial input information in the other of the crossbar switch registers associated with that particular machine function. Thus, as machine movements or functions are being effected in response to information previously stored, the tape reader is operative to transmit information from the record to preset whichever of the registers are required to receive the next block of information. The crossbar registers connected to effect machine functions are operative to continuously control the preselected positions of the various movable members without the necessity of separate clamps or brakes applied thereto. With each movable member retained in preselected position under continuous servo control, an extremely high degree of accuracy is accomplished during the subsequent machining operation, with the storage of additional words of a block of information taking place simultaneously therewith to expedite the performance of machine movements and machining operations under control of serial input information from the record. A tool select, and tool change mechanism is actuatable in response to the record of command input information in a manner that the next required tool is selected during one machining operation, with an interchange of tools being effected at the completion of the machining operation in a manner that a plurality of different cutting tool may be used to perform any predetermined sequence of different machining operations. The entire arrangement provides an integrated control system operative to provide a series of machining operations upon a workpiece, without the necessity of manually repositioning the workpiece or changing the tools to suit the requirements of different kinds of machining operations during the same program of operations.

The foregoing and other objects of the invention, which will become more fully apparent from the following detailed specification, may be achieved by means of the exemplifying embodiment depicted in and described in connection with the accompanying drawings, in which:

FIG. 3 is a diagrammatic view of a process planning sheet for establishing a particular program of operations, in combination with a tape code represented in conjunction with each of the various words of input information;

FIG. 3A is a fragmentary view of a portion of control tape illustrating the binary tape code;

FIG. 4 is a schematic representation of a portion of one of the crossbar registers for a particular machine function;

FIG. 5 is a schematic view of another portion of the crossbar register utilized to store information for the particular function;

FIG. 6 is an enlarged fragmentary view, showing the structural arrangement of a portion of the crossbar registers represented in FIGS. 4 and 5;

FIG. 6A is an enlarged fragmentary detailed view, partly in elevation and partly in vertical section illustrating the operation of a latch plate for one stack-up of switch contacts;

FIG. 6B is an enlarged fragmentary detailed view of a latch plate and coacting switch actuator, partly in plan and partly in horizontal section through the actuator shown in FIG. 6A;

FIG. 7A is a fragmentary view, partly schematic and partly in vertical section of the interconnected synchros in FIG. 7;

Figure 12:
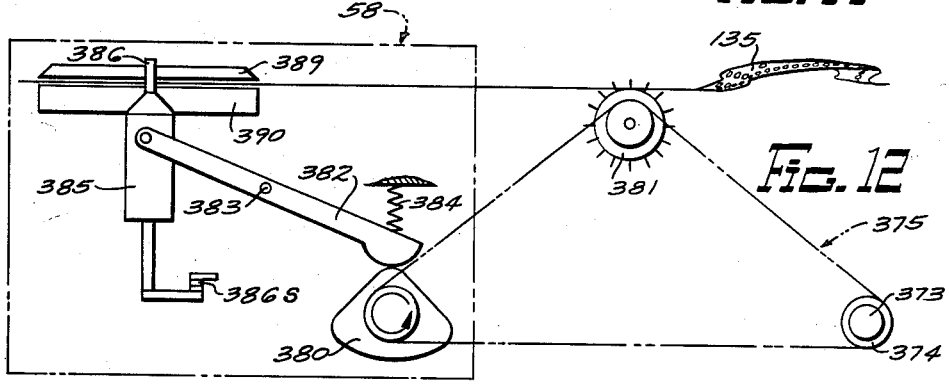
Figure 13:
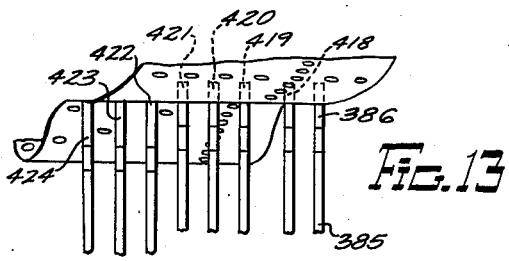

FIG. 8, 9, 10 and 11 comprise a simplified, diagrammatic line diagram of an electrical circuit for controlling the transmission of storage information from the record into one or another of the crossbar registers;

FIG. 12 is a diagrammatic, fragmentary view of a tape reader in connection with the drive mechanism therefor;

FIG. 13 is another fragmentary representation of the tape reader in conjunction with a switch mechanism actuated by the binary coded control tape;

FIG. 14 is a diagrammatic representation, taken partly in longitudinal vertical section, and showing the work supporting index table in combination with the indexable control circuit therefor;

FIG. 15 is a fragmentary diagrammatic representation of a portion of the control system for effecting selective indexable movement of the tool carrying storage drum;

FIG. 16 is a fragmentary view of the cutter carrying spindle in combination with the tool storage drum and the tool change mechanism positioned therebetween; and FIG. 17 is an enlarged diagrammatic view, partly in perspective and partly in longitudinal section, illustrating the control circuit and mode of operation of the tool change mechanism.

Figure 1:
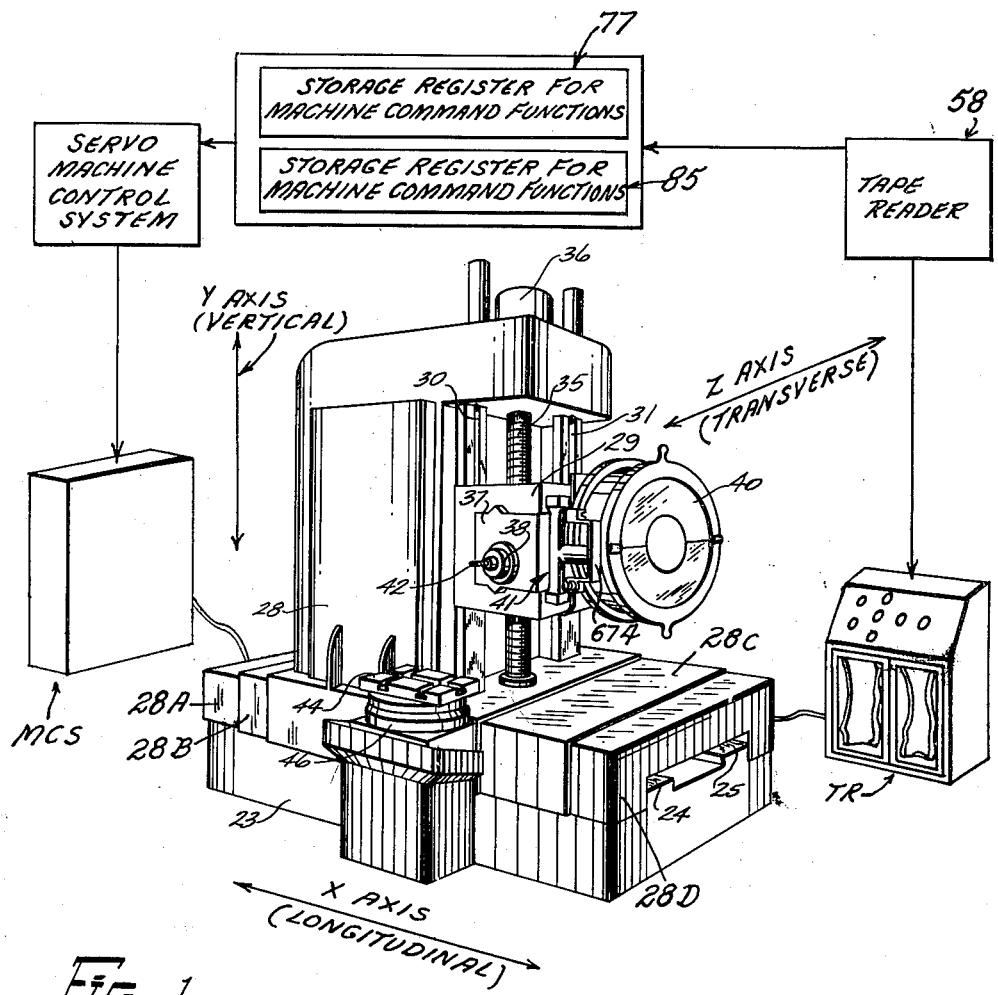
FIGURE 1 is a view in perspective of a machine tool in combination with a diagrammatic representation of a control system therefor, and together embodying the principles of this invention.

Referring more specifically to the drawings and particularly to FIG. 1 thereof, the machine tool illustrated as incorporating a preferred embodiment of the present invention comprises a supporting base 23 provided with longitudinally extending, spaced apart way surfaces 24 and 25. A vertically upstanding column 28 is provided on its underside with complementary way surfaces (not shown) adapted to slidably engage the horizontal way surfaces 24 and 25 in a manner that the entire column 28 is slidable in a longitudinal direction designated herein as the X axis. Telescoping way guards 28A, 28B, 28C and 28D are provided to protect the ways 24 and 25. A vertically movable saddle 29 is provided with vertically extending spaced apart way surfaces (not shown) that engage ways 30 and 31 angularly formed with the vertically upstanding column 28. To effect selective vertical movement of the saddle 29 relative to the upright 28, there is provided an elevating screw 35 journalled to rotate at its opposite ends in upper and lower lateral extensions integrally formed with the upright 28. A motor 36 is connected to drive the elevating screw 35, the latter engaging a cooperating nut member (not shown in FIG. 1) secured within the saddle 29 for vertical movement in a direction hereinafter designated as the Y axis. A spindle supporting head 37 is slidably guided by the saddle 29 for rectilinear movement in a plane transverse to the longitudinal movement of the upright 28 along an axis hereinafter termed the Z axis.

A power driven tool spindle 38 rotatably journalled in the spindle head 37 is positioned in fixedly spaced relationship to a tool storage drum 40 rotatably secured to a side face of the spindle head 37 for selective indexable movement, as shown in FIGS. 1 and 16. Between the tool storage index drum 40 and the front face of tool spindle 38, there is provided a tool change mechanism 41, including a tool change arm 674 shown in its inwardly pivoted parked position in FIG. 1. To perform a selected machining operation upon a workpiece, a cutting tool, such as the drill 42 in FIG. 1, may be releasably secured within the tool spindle 38 for bodily movement along the Z axis relative to a workpiece.

A workpiece [not shown] is supported by a pallet that is releasably clamped to the upper face of a selectively indexable work support member or table 46. For purposes of this disclosure, the pallet 44 may be considered the work supporting portion of the indexable table 46. The arrangement is such that the index table 46 may be angularly adjusted about a vertical axis for moving a workpiece carried thereby to a selected indexed position with respect to the tool spindle 38. After a workpiece is indexed to a selected position, the tool spindle 38 may be coordinately positioned along the X and Y axes after which the drill 42 may be advanced toward a workpiece (not shown) along the Z axis to perform a drilling operation in any preselected position. After performing one drilling operation to a required depth setting, the drill is retracted from engagement with the workpiece and moved to the next required position for drilling the next hole.

Thus, the spindle head 37 may be sequentially moved to a plurality of different positions, and the spindle head advanced and retracted in a manner that a series of holes can be drilled in one or another of four faces of a rectangular workpiece, depending upon the indexed position of the table 46, in a predetermined sequence of preselected positions, and without moving such a workpiece from the pallet. In the event that different sizes of drilled holes are required, the drill 42 shown as being carried by the tool spindle 38 in FIG. 1 may be interchanged with a preselected tool from the indexable tool storage drum 40 by operation of the tool change mechanism 41. To accomplish this, the tool storage drum 40 is caused to be indexed during the previous machining operation in a manner to move a preselected tool, such as the cutter 48 to a tool change ready station 47, represented by the dotted lines in FIG. 16 as being in perpendicular spaced relationship to the tool spindle 38. As shown in FIG. 16, the tool change mechanism 41 is shown in parked position by means of the dotted lines, with the cutter 48 being carried in a tool socket 49 in the tool change station. At the completion of the previous machining operation, and with the spindle head 37 returned to a retracted "home" position, a tool change cycle effects forward pivotal movement of the storage socket 49 for moving the preselected tool 48 to a position in spaced parallel relationship to the tool in the spindle, and simultaneously therewith, forward pivotal movement of the tool change mechanism 41 to the solid line position represented in FIG. 16. As soon as this occurs, the tool change mechanism 41 is operative to effect an interchange of the tool 48 with the tool 42 carried by the tool spindle 38. At the completion of a tool change cycle, the tool 48 will then be carried by the tool spindle 38 and the tool 42 carried by the tool storage socket 49, now represented in FIG. 16 as supporting the tool 48. Subsequent to this, the tool change mechanism 41 is pivotally returned to its dotted line parked position, and tool 42, supported by the tool change socket 49, is pivotally returned to a position perpendicular to the tool spindle 38 and parallel to the rotational axis of the tool storage drum 40.

After the tool change mechanism 41 and storage socket 49 are returned to the dotted line positions represented in FIG. 16, the tool carried by the tool spindle 38, in this case tool 48, may be operatively moved to perform the next required machining operation. Likewise, the tool storage drum 40 may be then indexably moved to position the next required tool in the tool change position, in perpendicular spaced relationship to the tool spindle 38.

It will be apparent that by indexably repositioning the worktable 46 in each of four different positions, cutting tools 42 and 48 or any other required tools may be advanced toward a workpiece to perform any required sequence of machining operations. It will be further apparent that no manual repositioning of a rectangularly shaped workpiece, or manual repositioning of the tool, such as the tool 42, in the tool spindle 38 is required to operate on four sides of such a workpiece.

According to the principles of this invention, selective positioning of the major relatively movable members including the indexable work supporting table 46 and the bodily movable tool spindle head 37, as well as a selective interchange of tools between the tool spindle 38 and the tool storage drum 40, are under the control of an automatic digital control system including a source of recorded data operative to effect the required positioning, rate change, tool select and tool change functions. In a preferred form of the invention, the source of recorded data is likewise adapted to be stored for subsequent use in a novel form of storage register while machine functions are being performed in response to previously stored data. As generally represented in FIG. 1, a tape reader in a control cabinet TR scans a tape containing digitized input data for presetting one storage register contained within a control cabinet MCS. A machine control system within the cabinet MCS is responsive to data in a preset storage register for operating the machine to perform selected machine functions in predetermined sequence.

Figure 2:
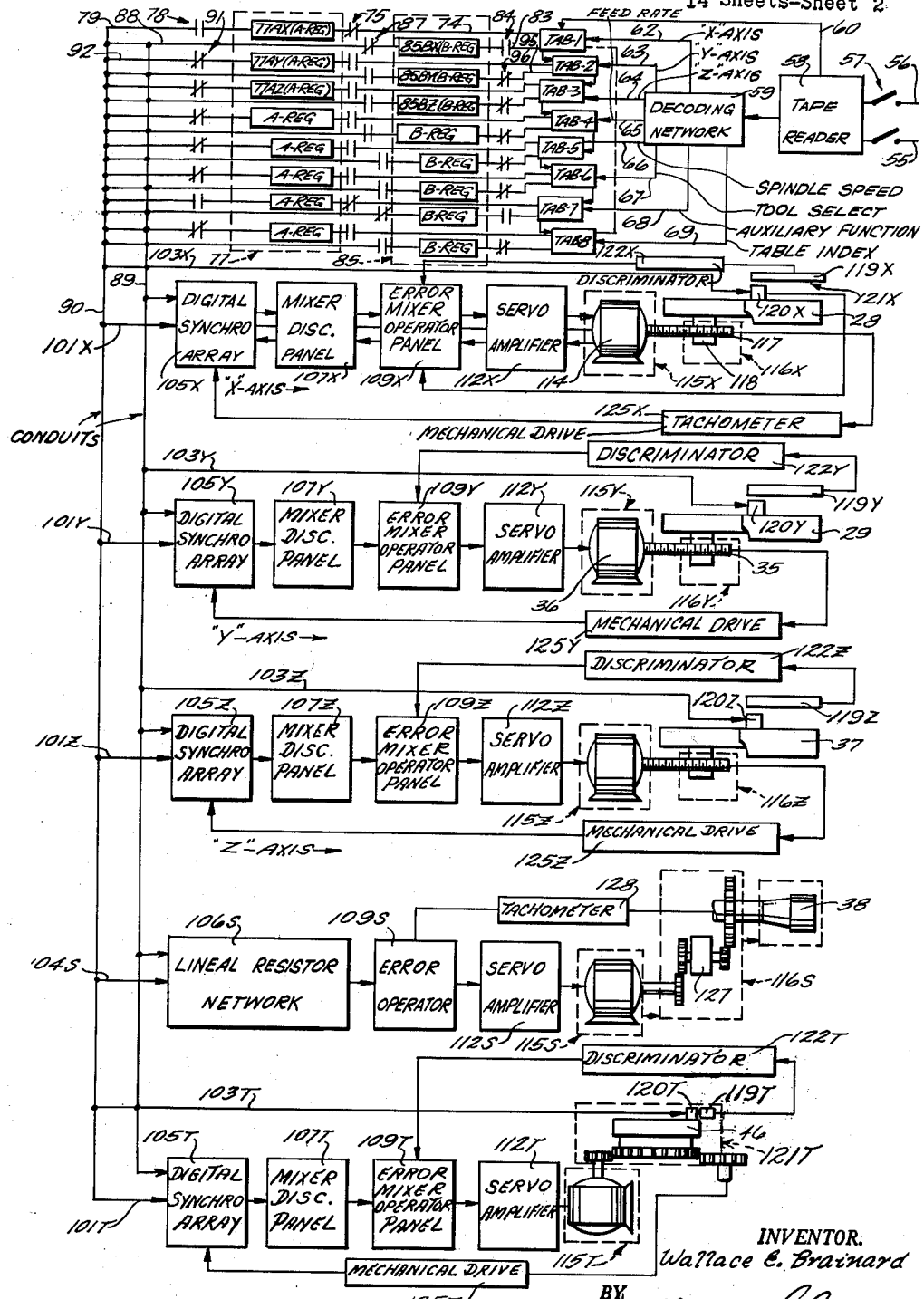
FIG. 2 is a diagrammatic block diagram of a preferred form of numerical control system for effecting machine movements in combination with a diagrammatic representation of a tab sequence device for sorting and sequentially inserting different words of information from the serial input into the proper storage register.

To accomplish the machine functions enumerated in the preceding paragraph, as schematically shown in the block diagram, FIG. 2, a switch 57 is closed to connect energized input supply conductors 55, 56 to energize a tape reader 58 which is connected to transmit a binary coded, digital input supply signal in serial form to a decoding network 59. The tape reader 58 is adapted to supply successive words of numerical data, each word representing numerical command data for a function, and each group of words representing separate blocks of information respectively associated with, and connected to initiate one of the eight machine functions that are available, and that are shown for illustrative purposes. Likewise, the tape reader is connected via a conductor 60 to activate a tab sequence device, the tabs being numbered 1 to 8, inclusive for the purpose of transmitting information from the decoding network 59 to a storage register associated with a particular machine function.

As schematically shown in FIG. 2, information from the decoding network 59 is transmitted by a conductor 62 to tab No. 1 and thence to either the associated A or B register where it is stored for subsequent use to control movement along the X axis. As soon as information is stored for effecting positioning movement along the X axis, the decoding network 59 is cleared of the X axis information and the tape reader activates the tab sequence device via conductor 60 to connect the decoding network 59 via a conductor 63 to tab 2. Information from the tape reader 58 is then transmitted to the decoding network 59 from whence it is transferred via conductor 63 to tab 2 and fed into the associated A or B register, where it is stored for subsequent use to effect positioning movement along the Y axis. In a similar manner, after decoding network 59 has again been cleared, information for effecting Z axis positioning movement is transmitted from the decoding network 59 via conductor 64 and tab 3 from whence it is stored in either the associated A or B registers. As will hereinafter be more fully explained, the storage registers, A and B, for the X, Y and Z axes are alternately adapted to store information in the form of sine-cosine voltage ratios for effecting point to point positioning of the upright 28, saddle 29 and spindle head 37, as shown in FIGS. 1 and 2.

Tabs 4 and 5 are respectively and sequentially connected via conductors 65 and 66 to receive information from the decoding network 59 for storing information relating to the feed rate and the spindle speed in the appropriate A and B storage registers in the form of linear voltage ratios. From the decoding network 59, the next word of numerical command information is transmitted via conductor 67 to tab 6, this information being stored in the associated A and B registers to provide a binary coded output to effect an appropriate indexing movement of the tool storage drum 40, FIG. 1, for advancing a particular preselected tool into the tool change ready station 47, FIG. 16. Likewise, information for effecting one of a plurality of auxiliary functions is transmitted from the decoding network 59, and transmitted via a conductor 68 and tab 7 to an appropriate A or B storage register, and stored therein to provide a binary coded output. In similar manner, the next word of numerical information from the decoding network 59 is transmitted via the conductor 69 and tab 8 for initiating an appropriate indexable movement of the wrok supporting table 46. This information likewise is stored in an associated A or B storage register. In all cases the numerical coded data for each function is termed a "word" of information, with the successive words of information for all functions being termed a block of information.

After all of the tabs, including 1 to 8 inclusive, have been utilized to transmit information in sequence, where required for a particular function, from the decoding network 59 to one or another of the associated storage registers; the next block of information can be sequentially transmitted from the tape reader 58 to the decoding network 59, providing both an end of line signal and a machine complete signal are effected as will hereinafter be more fully explained. In all cases, separate tab signals are coded directly on the punched tape to separate words of numerically coded information for the various machine functions including the X, Y, and Z axes. In the event no information is required for the X and Y axes, the appropriate tab signals are still provided on the punched tape to insure that the next succeeding word of information for the Z axis is transmitted from the tape reader 58, to the decoding network 59, and thence to tab No. 3 for storage in either the A or B register. It will be apparent, therefore, that a tab code signal is provided on the punched tape for each available machine function, irrespective of whether such a tab code is followed by a particular coded word of numerical command information for that particular function. Thus, information for a particular machine function is always transmitted from the tape reader 58 via the decoding network 59 to the proper one of the A or B storage registers.

It will now be assumed that the tape reader 58 is started to provide information for the X axis, requiring that conductor 60 be activated to connect tab 1 to transmit information from the decoding network to a conductor 74 via closed contact 75 to store the X information in the A register No. 77AX. During this period of reading subsequent information from the tape reader into the decoding network, contact 78 is in open position to preclude transmission of data from register 77AX to conductor 79. As information is being read into the register 77AX, a contact 83 is in open position to preclude transmission of information from tab 1 to register 85BX for the B storage register for X axis information. Assuming that information has been previously stored in the register 85BX, the selected sine-cosine voltages will be transmitted via a closed contact 87 to conduits 89 and 90 containing the various output supply lines for the various machine functions.

As illustrated in FIG. 2, the A register 77AY for the Y axis is connected via a closed contact 91 to a conductor 92 to the conduits 89 and 90. With this condition existing, after X axis information has been read into the register 77AX, the decoding network 59 is cleared; and the tape reader advances to operate the Y tab code on the tape, thereby connecting tab 2 to transmit Y axis information into the corresponding B register 85BY. Thus, as the punched tape is read by the tape reader 58, Y axis information is transmitted to the decoding network 59 and thence via a conductor 63, tab 2, conductor 95 and a closed contact 96 to the register 85BY. At the same time, assuming information is stored in the register 85AY, command voltage signals therefrom are transmitted via a closed contact 91 to a conductor 92 and thence via conduits 89 and 90 to effect machine movement along the Y axis. Subsequent advancement of the tape reader 58 sequentially throughout the remaining tabs 3 to 8, inclusive, provides for storage of appropriate information into whichever of the registers (A or B) that is not connected to the output conduits 89 and 90. In the event no word of numerical information is available, for example for spindle speed (conductor 66), a double tab signal on the tape will cause the next word of information to be stored in the appropriate register associated with tab 7. During operation of the machine, one or another of the registers for each machine function is always connected to conduits 89, 90 at the same time information is being stored in the other associated register.

In the described example, registers 85BX and 77AY are both connected to supply previously stored information to the conduits 89 and 90. Inasmuch as neither of the registers 85BX and 77AY is then connected to receive input information, new information is thus read into storage registers 77AX and 85BY, neither of the latter being connected to conduits 89 and 90. With the described arrangement, as shown in FIG. 2, new information from the tape reader 58 is always read into the available connected storage registers via the decoding network 59 in serial form. At the completion of reading a complete block of information, i.e., words of numerical data associated with tabs 1 to 8 inclusive, the newly stored information from whichever of the storage registers has been connected to receive such information is immediately and simultaneously read out in parallel form to conduits 89 and 90, thereby effecting the next required machine movements or functions. Upon completion of reading a complete block of information for tabs 1 to 8 inclusive, and upon completion of the previous machining operation, the tape reader 58 is actuated to store the next complete block of information for tabs 1 to 8, inclusive, and simultaneously therewith, the most recently activated registers (A or B) is connected to provide the parallel read-out of stored information to conduits 89, 90. To provide for substantially continuous machine operation, the punched tape is so programmed that the tape reading time for one complete block of information (tabs 1 to 8, inclusive) is substantially equal to the time required for effecting a machine function or machining operation which is disposed to occur during that reading time. This means that the read-in time for supplying serial input information from the reader 58 to the registers is preferably equal to the parallel read-out time to effect machine movements.

One of the principal advantages of this invention is the fact that each of the major movable members including the upright 28, the saddle 29 and spindle head 37 is positively retained in preselected position under dynamic servo control responsive to previously stored command signals. Usually, of course, only two of the major members are retained in preselected position, while the third is moved to effect a particular selected machining operation. For example, with the upright 28 and saddle 29 moved to the preselected position, these members are positively retained in such position by sine-cosine voltage ratios stored, for example, in corresponding registers 85BX and 77AY, as shown in FIG. 2. With this condition existing, the spindle head 37 may be moved forwardly to urge the drill 42 into engagement with the workpiece to perform a drilling operation. Thus, the spindle head 37 is advanced and retracted along the Z axis, to perform the drilling operation, while the coordinate location of the spindle head with respect to the X and Y axes is being maintained under continuous servo control. With a preselected position being positively maintained by a connection back to the reference voltage in the storage registers, no separate clamps or auxiliary clamp devices are required to maintain a preselected position.

To accomplish this, as shown in FIGURE 2, the proper command voltage output information from the A and B registers is transmitted via the conduit 90 to an appropriate one of four common conductors 101, connected to supply reference voltage to a digital synchro array 105. To simplify the description, the four branch conductors and digital arrays have been respectively designated by common numerals 101 and 105, each followed by a letter suffix to indicate the particular axis or movement being controlled. To control the spindle speed, a circuit can be traced from the decoding network 59, output conductor 66, tab 5, the corresponding A or B register, conduit 90, and a branch conductor 104S to a lineal resistor network 106S.

Referring again to the common conductors 101 and 105, the reference control voltage from conduit 90 is transmitted via conductor 101X to the digital synchro array 105X, via a mixer discriminator panel 107X, to an error operator 109X which is connected to control a servo amplifier 112X for coarse positioning of a power actuator 115X. The power actuator 115X is connected to drive a power translator 116X, which is in turn connected to effect movement of the upright 28. The power translator 116X is represented in FIG. 2 as comprising a screw 117 driven directly by a motor 114, the screw 117 threadedly engaging a nut 118 secured directly to the underside of the upright 28. The screw 117 is diagrammatically represented in FIG. 2 as being coupled by means of a mechanical drive 125X to effect rotational movement of the synchros in the array 105X. Further, for fine positioning, the appropriate registers are connected via conduit 89 and branch conductors designated by the common numeral 103 to a reader or slider 120X secured directly to the upright 28, and disposed to cooperate with an electrically wound scale 119X, the scale windings being connected via a discriminator 122X to supply position feedback information to the error operator 109X.

The general arrangement for effecting preselected point to point positioning of the upright 28, the vertically movable saddle 29, and the transversely movable spindle head 37 is identical and, in all cases, like reference numerals followed by the appropriate suffix (X, Y or Z) are utilized to designate like portions of the control circuit. A similar point to point positioning control is provided for effecting indexable movement of the work supporting table 46, although the table is disposed to be normally positioned at fixed increments of 45° with respect to the cooperating tool spindle 38. The reading head 119X and scale 120X coact to comprise a lineal resolver 121X, with the discriminator 122X being operative to provide an accurate feedback signal to indicate the exact position of the column upright 28 as it is moved on the frame along the X axis. The error operator 109X operates to produce voltages proportional to the magnitude of the error, as well as polarity indicating the direction of position error. The power actuator 115X may comprise a servo valve controlled hydraulically operated servo motor, or an electric motor 114, shown for illustrative purposes in the drawings, which is directly connected to drive the column moving translating screw 117. Column control in the embodiment illustrated in FIG. 2 is effected by the servo amplifier 112X which is operative in well known manner to control movement of the electric motor 114 through armature or field supply. Movement along the Y and Z axes, as well as indexing movement of the work support 46, is controlled in a similar manner.

For controlling the speed of the spindle 38, the branch conductor 104S is connected to control the output of the lineal resistor network 106S, which in turn is connected to control the error operator 109S connected to the servo amplifier 112S. As hereinbefore explained, the servo amplifier 112S is connected to control the speed of power actuator 115S which is connected via a gear-type power translator 116S, incorporating a range changer 127, to rotate the tool spindle 38 at the selected speed and in the required direction. A tachometer 128 connected to be driven by the tool spindle 38 is connected to supply a feedback signal to the error operator 109S for accurately regulating the spindle speed, according to the output voltage from the lineal resistor network.

It will be noted that in FIG. 2 the decoding network 59 is provided with eight output conductors respectively and sequentially associated with tabs 1 to 8 inclusive; tabs 1, 2, 3, 5, and 8 being represented in FIG. 2 as effecting continuous servo control over the X, Y, and Z axes, as well as the spindle speed and the angular position of the index table. The various functions relating to feed rate, tool select and auxiliary functions (tool change) are respectively controlled by tabs 4, 6, and 7 as will hereinafter be more fully explained.

It will be readily apparent that the inventive principles embodied in this invention are not necessarily restricted to either five or eight tabs. Depending upon the required number of different machine functions available, the advantages of this invention can be achieved with equal facility with any other number of tabs for effecting a corresponding number of machine functions. It is emphasized that the tabs, such as tabs 1 to 8 inclusive in FIG. 2, provide an accurate means for isolating the various words of each complete block of serial input information, and transmitting such information to a particular portion of the complete control circuit associated with a corresponding machine function or movement which is respectively disposed to be identified by one of the tabs.

In FIG. 3, a process planning sheet 134 is shown diagrammatically in conjunction with a portion of a control tape 135, the latter being provided with eight channels for coded input information and a row of sprocket holes to engage a drive sprocket on the tape reader. In preparing the tape for one continuous program of machining operations, the initial step is to select a predetermined sequence of machine movements or functions. For this purpose, the process planning sheet is provided with eight vertical columns carrying the legends corresponding to the particular machine functions to be performed, and is provided with a plurality of horizontal lines, only three of which are illustrated in diagrammatic, fragmentary form in the drawings. Each of the horizontal lines is in turn divided into an A line and a B line, respectively adapted to receive handwritten program information, and typed program input information. An additional vertical column (not shown) is provided to the left of the longitudinal X axis information contained in column No. 1 for the purpose of describing the operation to be performed by that particular line of input information. In preparing a tape for operating the machine, the information required for each machine function is written in the A portion of each of the columns, as shown in columns one to three inclusive of FIG. 3. After this, the process planning sheet 134 is inserted in a standard tape preparation machine, and the exact information corresponding to the handwritten information for each machine function is typed in the B portion of each line. Simultaneously with the typing of the program information, the tape preparation machine is adapted to punch corresponding coded input information in binary coded form on an eight channel tape.

A visual inspection of FIG. 3 indicates that the tab stops for each of the vertical columns on the process planning sheet 134 correspond to tabs 1 to 8 inclusive associated with the machine control system as described in connection with FIG. 2.

Although the legends identifying the vertical columns shown in FIG. 3 are self-explanatory, it is to be noted that each word of numerical data on the processing sheet 134 corresponds to a portion of a block of serial input information on the tape 135. Each word of binary coded numerical information on the tape 135 is separated from the next word by a transverse line of five holes (in channels 2, 3, 4, 5 and 6) to constitute a tab change, for connecting the decoding network to store information in the next portion of the storage register. Each line of information on the process sheet 134 corresponds to a block of serial input information comprising successive lines of punched holes on the tape 135, the blocks of information on the tape being in turn separated by a single punched hole located in channel 8. The successive blocks of information on the tape 135 are thus separated by the punched hole representing an end of a line signal, this signal together with a machining complete signal operating to interchange the storage registers where required by storage of new information and to activate the tape reader to store the next block of information in whichever of the registers that are not at that time connected to effect machine movements.

Channels 1, 2, 3, 4, and 6 are respectively utilized to receive the machine code, which is the well known binary code designated by numbers 1, 2, 4, 8 and 0 shown to the right of tape 135. The actual punched holes required for each digit of information are indicated in FIG. 3A, which also indicates the tab code and the end of line code. Referring again to FIG. 3, channel 5 is a parity check, this hole being automatically punched in channel 5 whenever the code for a particular transverse line on the tape requires an uneven number of holes.

As further represented in FIG. 3, each "bit" of informaton represents a transverse hole or line of holes on the tape 135, corresponding to the digit of a word of numerical data represented below the tape.

For convenience in the drawings, referring again to FIG. 2, the A register for all functions is represented within the dotted lines 77, and the B register for all machine functions is represented within the dotted lines 85. Separate A registers comprising individual register portions for storing information for the X, Y and Z axes are schematically denoted by the separate boxes 77AX, 77AY and 77AZ shown in solid lines. In a similar manner, separate boxes 85BX, 85BY and 85BZ are schematically shown in solid lines and designated as being associated with the X, Y and Z axes to comprise individual register portions of the entire B storage register 85. It is emphasized that the separate registers indicated for the various machine functions in FIG. 2 may actually comprise different portions of a single crossbar switch, such as the dotted line registers 77 and 85. In such a case, as will hereinafter be more fully explained, hold magnets and certain of the select magnets would be grouped for operation in conjunction with a particular machine function. Thus, activating the tab sequence control (1 to 8 inclusive) would selectively activate different portions of the single crossbar register for storing words of command information for particular machine functions. It is understood that according to the teachings of this invention, however, that separate storage registers actually may be used for each of the machine functions, as well as for the A and B registers for each function.

As hereinbefore explained, a principal advantage of the present invention is to utilize a crossbar switch as a medium for storing command information for performing a predetermined one of a plurality of machine functions or movements. Inasmuch as the crossbar switch registers for all machine functions are substantially identical in mode of operation, only the A and B registers for the X axis will be described in detail. As shown in FIGS. 4 and 5, a single crossbar switch register is schematically illustrated as capable of providing sine-cosine voltage ratios for effecting discrete positioning movement of the vertical upright 28 relative to the supporting base 23, as it is moved along the X axis. The portion of the switch shown in FIG. 4 is provided with a plurality of horizontal input conductors connected to be energized by taps from the secondary winding of a 400 cycle input transformer 141. By coded operation of the crossbar switch, various of these taps are connectable to the vertical output conductors to supply voltages of predetermined magnitude for energizing the synchro array 105X, FIGS. 2 and 7. The selected output voltages from the transformer 141 are disposed to provide reference excitation voltages corresponding to the voltages from a command synchro array, and are fed to the stator windings of the position control synchro array to sequentially induce error voltages from the rotors thereof, unless the upright is already moved to the required position.

In a similar manner, the horizontal conductors of the portion of the crossbar switch shown in FIG. 5 are connected to various taps from a 10 kc. supply source 142, as well as a plurality of adjustably energizable secondary windings interconnected therewith to constitute a transformer network. Thus, coded operation of that portion of the X axis register shown in FIG. 5 interconnects the required taps from the 10 kc. transformer network to the windings of the slider 120X of the lineal resolver 121X, FIG. 7, thereby inducing an error voltage in the output from the cooperating winding in the scale 119X of the resolver, unless the position requirement is already satisfied. As will hereinafter be more fully explained, the 10 kc. input together with the transformer network interconnected therewith provides a source of high frequency sine-cosine reference voltage to very accurately control final positioning movement.

The single crossbar switch and transformer networks schematically represented in FIGS. 4 and 5 are provided with select magnets 145 to 154, inclusive, that are respectively connected to actuate corresponding select rods 155X to 164X, inclusive. Simultaneously with the actuation of one or another of select rods 155X to 164X, inclusive, in response to energization of one of the select magnets 145 to 154, inclusive, corresponding select rods 155Y to 164Y, inclusive, are caused to be actuated. Select rods 155Y to 164Y, inclusive, are shown in fragmentary form, these rods being adapted to store information in another portion of the crossbar switch (not shown) to store the appropriate required voltage ratios for storing command information in the A or B register to effect discrete positioning movement along the Y axis. In order for circuits to be completed to the output conductors of the crossbar switch, however, appropriate ones of the hold magnets for the X axis (A or B register) or hold magnets (not shown) for the Y axis (A or B register) must be energized in coordinated timed relationship with the required select magnets 145 to 154, inclusive.

In order that the single crossbar switch shown in FIGS. 4 and 5 may be utilized for the storage of information for both the A and B registers of the X and Y axes, the cooperating hold magets of the crossbar switch are grouped to provide segregated areas in which different numerical words of the command information can be stored.

For example, the hold magnets for the A register of the X axis are diagrammatically illustrated in FIGS. 4 and 5 by the reference numerals 170 to 175, inclusive. Reading directly downwardly from reference numerals 170 to 175, inclusive, there are shown toward the bottom of the sheet the "AX" designations. The hold magnets for the B register of the X axis are indicated by the reference numerals 180 to 185, inclusive. In all cases, the hold rods connected to be actuated by one or another of the hold magnets are indicated by the reference numeral for a particular hold magnet followed by the suffix "X." For simplicity in the schematic representations, FIG. 4, there are indicated multiple switch connectors; for example, 170-1, 170-2 and 170-3, respectively connectable in response to movement of the hold rod 170-X upon energization of the corresponding hold magnet 170 to transmit current from a selected one of the horizontal output taps from the transformer 141. For simplicity output taps from the transformer 141. For simplicity the dotted circles there identified as 170-01, 170-02 and 170-03 respectively are diagrammatic representation of closed movable switch contacts, such as the open switch contacts actually shown in the fragmentary perspective view, FIG. 6, and which comprise a portion of the stackup 336C. Bodily upward movement of the switch contacts 170-01, 170-02 and 170-03 into engagement with the stationary contacts 353, 354 and 355 respectively is effected by vertical movement of the switch actuating member 347 in response to sequential pivotable movement of select rod 155X and hold rod 170X. Closure of contacts 170-01, 170-02 and 170-03 stores the first digit [zero] of the six digit number 04.7891, as schematically shown by the dotted circles in FIG. 4. In like manner, the switch connectors associated with the other hold magnets are designated by the number of the hold magnet followed by the suffix 1, 2 and 3 in FIG. 4 and 1, 2 in FIG. 5. In all cases, circuit transmitting connections can be made at the points of intersection between the horizontally disposed output conductors and one of the vertically disposed switch connectors.

Other values of the first digit of a six digit number are indicated by numerical reference numbers and associated lead lines to various intersections of horizontal output lines from the transformer 141 with the hold rod actuators responsive to hold rods 170-X and 180X for the AX and BX registers, as shown in FIG. 4. For example, storing the digit 1, as the first of a six digit number in the AX register, requires closure of switch contacts at 170-11, 170-12, and 170-13; digit 2 requires closure of contacts at 170-21, 170-22 and 170-23; and storage of the digit 3 requires closure of contacts at 170-31, 170-32 and 170-33.

There are six hold magnets, one for each digit of a six digit numerical word to be stored, that are selectively actuated in timed sequence with the select magnets 145 to 154, the latter respectively representing numerical values of zero (0) to nine (9) inclusive. Thus, for a six digit number in the AX register, all six of the hold magnets 170 to 175 are actuated to effect a total of fifteen (15) circuit connections through the crossbar switch; nine (9) of these connections being for the synchro array control, FIG. 4, and six (6) being for the lineal resolver control, FIG. 5.

The dotted circles in FIGS. 4 and 5 represent switch contacts that have been closed to store the numerical word 04.7891 in the A register for the X axis. The second digit (4) of this number is stored by closure of contacts 171–41, 171–42 and 171–43; and the third digit (7) by closure of the switch contacts 172–71, 172–72, and 172–73. In FIG. 5, the fourth digit (8) is stored upon closure of switch contacts 173–84 and 173–85; the fifth digit (9) by contacts 174–94 and 174–95; and, the sixth digit (1) by closure of contacts 175–14 and 175–15. It is not deemed necessary to show the remaining contacts, although one is provided at the intersection of each horizontal conductor and each vertical connector.

Whenever one of the select magnets 145 to 154, inclusive, is energized, energization of the appropriate hold magnet, for example, 170 in FIG. 4, will actuate hold rod 170–X to in turn effect an operative connection of the corresponding switch connectors 170–1, 170–2, and 170–3. In the event energization of the hold magnet 170 had been immediately preceded by energization of select magnet 145, three separate circuits would be simultaneously completed via switch connectors 170–1, 170–2 and 170–3 by movement of switch contacts 170–01, 170–02 and 170–03 into closed engagement with transformer output conductors 190, 192 and 193. It will be noted that the horizontal select rod 155X, actuatable in response to energization of select magnet 145, is represented in FIG. 4 as being aligned with a horizontal conductor 190 constituting one of a plurality of output taps from the 400 cycle supply transformer 141. Likewise, select rod 155X is diagrammatically represented in FIG. 4 as being provided with two other horizontal branches 155–X2 and 155–X3, respectively aligned with transformer output conductors 192 and 193. Actually, as will hereinafter be more fully described with reference to FIGS. 6 and 6A, the select rod 155X comprises a single pivotable rod. The dotted branches represented in FIGS. 4 and 5 are utilized only to clarify the development of preselected output voltages via the transformer net works, and constitute a schematic representation of the single pivotable select rod 155X. In all cases, energization of one of the select magnets, followed by energization of the required hold magnet, effects simultaneous circuit connections between three of the horizontally disposed transformer output conductors with three of the vertically disposed switch connectors associated with a particular one of the hold magnets by closure of three switch contacts.

Each of the three switch contacts 170–01, 170–02 and 170–03 may be considered as a portion of a "stack-up" of a crossbar switch. Each of these contacts is at a particular level with respect to the other vertically disposed switch contacts located at the intersecting points between the horizontal output conductors and the vertically disposed switch connectors.

Upon establishment of three circuits by a sequential energization of select magnet 145, FIG. 5, and hold magnet 170, FIG. 4; the select magnet 145 is deenergized and hold magnet 170 is retained in energized condition to maintain the three circuits established until the register is cleared as will hereinafter be more fully explained. With hold magnet 170 retained in energized condition, a circuit is established from conductor 190 via switch contact 170–01, as shown in FIGS. 4 and 6, this reference signal being transmitted via a closed contact 78–190 to an output conductor 191. In a similar manner, with hold magnet 170 remaining energized, a reference voltage circuit is completed from transformer tap 192 via a normally closed contact 78–194 to an output conductor 195. The reference voltage signal from output conductors 191 and 195, FIG. 4, is connected to supply command voltage information to the stator of a coarse positioning synchro 198, FIG. 7. The rotor 199 of the coarse positioning synchro 198 is, in turn, connected via output conductors 203, 204 to supply a first stage error signal to the mixer discriminator 107X.

Figure 7:
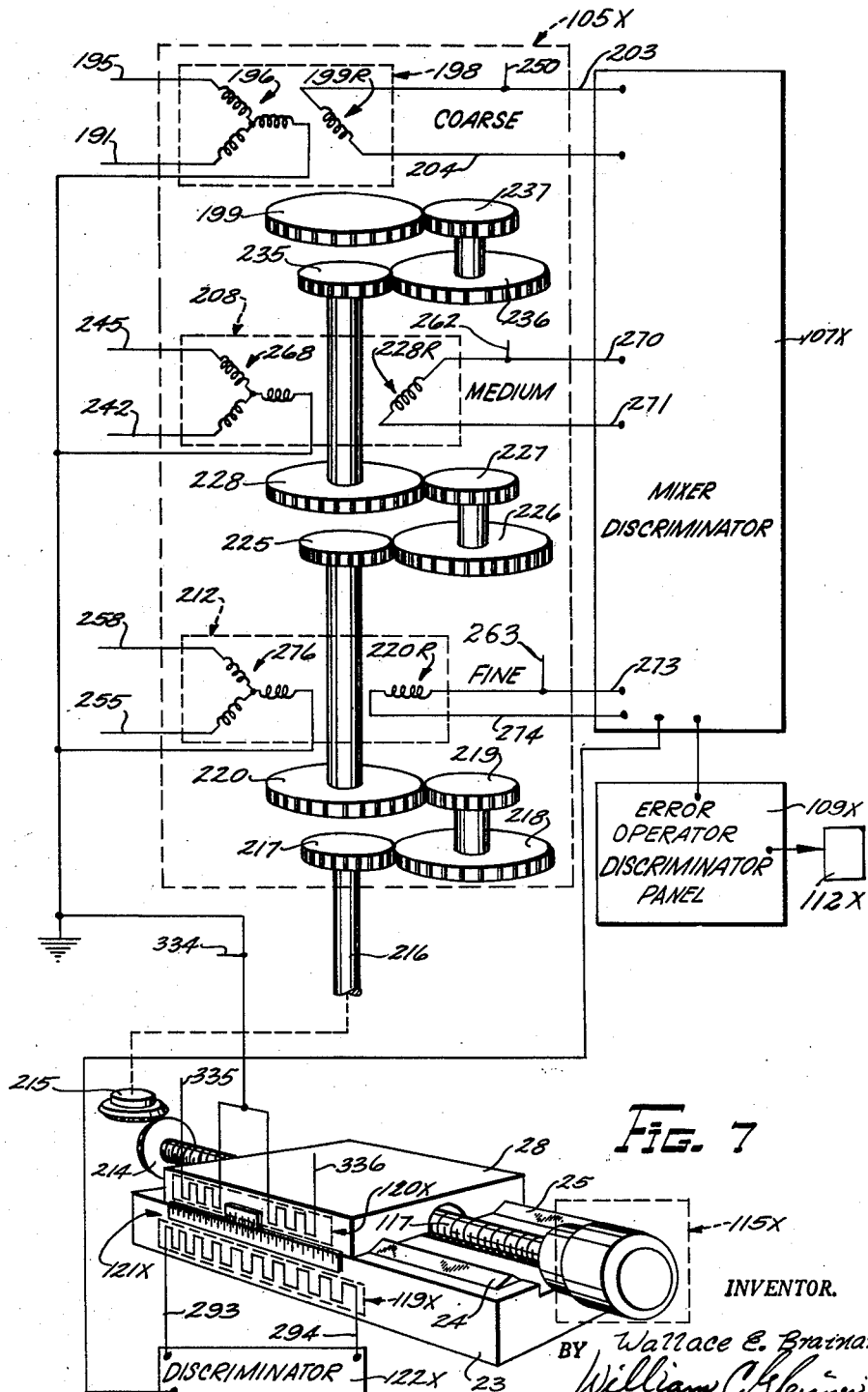
FIG. 7 is a schematic view of a three stage synchro array connected in series with a lineal resolver for effecting continuous control over a particular machine function.

The coarse positioning synchro 198, together with a medium positioning synchro 208 and a fine positioning synchro 212 are diagrammatically illustrated in FIGS. 7 and 7A as comprising the digital synchro array 105X. The three positioning synchros comprising the array 105X are mechanically coupled together and are connected to be driven by the translating screw 117, which is driven by the power actuator 115X to effect selective discrete positioning movement of the upright 28. At its opposite end, the translating screw 117 for the X axis is provided with a bevel gear 214 engaging a driven gear 215 connected to drive an input shaft 216 for driving the digital synchro array 105X. A gear 217 carried by shaft 216 is connected to drive reduction gears 218, 219 in a manner to rotate a gear 220 which is operative to effect rotational movement of the rotor 220R of the fine positioning synchro 212. In a similar manner, gear 220 is connected to drive reduction gears 225, 226 and 227 which are connected to rotate gear 228 for effecting corresponding rotational movement of the rotor 228R of the medium positioning synchro 208. Gear 228, in turn, is connected to drive reduction gears 235, 236 and 237, the latter being connected to effect rotation of the gear 199 which is connected to rotate the rotor 199R of the coarse positioning synchro 198.

The drive from the translating screw 117 to the shaft 216 is such that for each revolution of the screw 117 to effect movement of the upright 28 along the base 23, the rotor 220R of the fine positioning synchro 212 is rotated through one revolution. At the same time, the rotor 228R of the medium positioning synchro 208 is rotated through one-tenth of a revolution and the rotor 199R of the coarse positioning synchro 198 is rotated through one one-hundredth of a revolution.

Referring to FIG. 3, a six digit number is represented as supplying coded input information for effecting movement along the X axis. The first three digits of this number operate to supply input information for the digital synchro array 105X, represented in FIGS. 2 and 7. The first digit of this number controls the voltage input to the coarse positioning synchro 198; the second digit supplies voltage input information for the medium synchro 208; and, the third digit supplies command information for the fine positioning synchro 212. The last three digits of the X axis information in FIG. 3 are adapted to supply the required voltage input information for the slider 120X, FIGS. 2 and 7, which cooperates with the electrically wound scale 119X to control positioning movement for the last ten to twenty-thousandths (.010 to .020) of an inch.

The first digit for the A register of the X axis is controlled by energization of the hold magnet 170, FIG. 4, immediately after energization of one or another of the select magnets 145 to 154 inclusive. Thus, to store the zero [0] of the illustrative dimension, 04.7891, select magnet 145 and hold magnet 170 are sequentially energized to effect closure of multiple cross bar switch contacts 170–01, 170–02 and 170–03, indicated in FIGS. 4 and 6. The second digit for the A register of the X axis is controlled by energization of the hold magnet 171, FIG. 4, immediately after one or another of the select magnets 145 to 154, inclusive, FIG. 5, are energized. In a like manner, the third digit for the A register of the X axis is controlled by energization of a hold magnet 172 after energization of one or another of the select magnets 145 to 154, inclusive.

The second digit (4) for the X axis information in FIG. 3 requires energization of select magnet 149, thus effecting corresponding actuation of select rod 159X, FIGS. 4 and 5. Immediately subsequent to energization of select magnet 149, the hold magnet 171 for the second digit of the X axis is energized to establish the circuit for supplying a command voltage to the medium positioning synchro 208, FIG. 7. Upon energization of hold magnet 171, associated crossbar switch contacts 171–41, 171–42 and 171–43 are closed to respectively engage horizontal transformer output conductors 238, 239, and 240. With a seal-in circuit established to retain hold magnet 171 energized, the first of these circuits extends from horizontal conductor 238, via closed contact 171–41, the vertically disposed switch connector 171–1, and thence via a normally closed contact 78–241 to an output conductor 242. In a similar manner, a circuit is completed from transformer output conductor 239 via the now closed switch contact 171–42 and thence via a normally closed contact 78–244 to a conductor 245 which, together with conductor 242, is connected to supply the proper voltage to the stator 268 of the medium position synchro 208, FIG. 7. Energization of hold magnet 171 likewise effects completion of the circuit from horizontal conductor 240 via the closed switch contact 171–43, vertical connector 171–3, and a normally closed contact 78–248, and thence through one winding of a transformer 249 to supply an interpolating voltage to output conductor 250 which is connected to supply interpolating voltage to the conductor 203 from the synchro rotor 199R, FIG. 7. A conductor 270 as well as another output conductor 271 is connected to supply the required error signal from the rotor of the medium positioning synchro to the mixer discriminator network 107X.

Storage of the third digit (7), FIG. 3, in the A register for the X axis is initially accomplished by sequential energization of select magnet 152 and hold magnet 172, which is retained in energized condition to supply the positioning voltage signal for the fine positioning synchro 212, FIG. 7. Energization of hold magnet 172, FIG. 4, actuates the hold rod 172–X to effect movement of switch contacts 172–71, 172–72 and 172–73 to respective circuit completing engagement with horizontal transformer output conductors 251, 252 and 253. The first of these circuits is completed from the transformer output conductor 251 via the switch contact and thence via a normally closed contact 78–254 to conductor 255. The second of the reference voltage circuits for the third digit of the X axis is then established from transformer output conductor 252 via switch contact 172–72 and the normally closed contact 78–257 to an output conductor 258. The third circuit for the third digit of the X axis is then completed from conductor 258 via the switch contact 172–73, vertical connector 172–3, a normally closed contact 78–260, and one winding of transformer 261 to supply an interpolating voltage via output conductor 262. As shown in FIG. 7, the reference voltage for the third digit is transmitted via conductors 255 and 258 to a stator 276 of the fine positioning synchro 212. The error voltage from the rotor 220R of the fine positioning synchro 212 is transmitted via conductors 273 and 274 to the mixer discriminator 107X. The interpolating voltage signal is transmitted from conductor 262 to one of the error signal conductors 270, for the medium positioning synchro. Another interpolating voltage from a source 264 is transmitted via conductor 263 to error output conductor 273, as shown in FIGS. 4 and 7.

The fourth digit represented for the A register of X axis information in FIG. 3 is stored in the crossbar register by energization of the hold magnet 173, FIG. 5. The fourth digit corresponds to hundredths (.01) of an inch. In a similar manner, the fifth digit is stored by energization of hold magnet 174, the fifth digit representing thousandths (.001) of an inch. The sixth and last digit is stored in the crossbar register by energization of hold magnet 175, this digit representing ten-thousandths (.0001) of an inch. For effecting fine positioning, the resolver 121X, FIG. 7, is responsive to sine-cosine voltage signals stored in the crossbar registers shown in FIG. 5.

The lineal resolver 121X comprises the slider 120X and the wound scale 119X, respectively analogous to the stator and rotor of a rotary synchro. The scale 119X is provided with a single winding having a pole spacing of one-twentieth of an inch in a manner that one-tenth inch corresponds to 360° (electrical) and is connected via conductors 293 and 294 to supply an output voltage as a function of position to the discriminator 122X. The discriminator operates to amplify the error signal from the scale 119X and transmit it to the mixer discriminator 107X. Coacting with the winding carried by the scale 119X is the slider 120X which is provided with two spacephase windings spaced 90° apart and is so positioned as to overlie and be parallel to the windings of the scale, spaced approximately ten thousandths (0.010) inch from it.

To retain hold magnets 170, 171 and 172 energized, seal-in circuits are completed through contact bars 170C, 171C and 172C for sealing in command voltage signals for the first three digits of a six digit number.

As hereinbefore explained, final positioning of the upright 28 along the X axis is effected by the lineal resolver 121X, which likewise functions to continuously retain the upright 28 in preselected position during a subsequent machining operation involving movement of one or another of the major movable slides, i.e., vertical movement of the saddle 31 or transverse movement of the spindle head 37 while the upright 28 is dynamically maintained in a preselected positions. As hereinbefore indicated, it is emphasized that the lineal resolver 121X is the equivalent of a rotary synchro. Thus, a fourth rotary synchro [not shown] can be connected by reduction gearing to the three stage synchro array 105X, to constitute a fourth, or fine, positioning stage in lieu of the lineal resolver 121X. The general principles of utilizing a synchro array to develop an error voltage signal for accurately positioning a moving element are well known in the arts, and are commercially available. Inasmuch as the present invention is not directed to the positioning control per se or the electrical interconnection to develope the final positioning error voltage signal, the schematic representation shown in FIG. 7 and described herein is deemed adequate for the present disclosure.

Sine-cosine reference voltages from the 10 kc. input source 142, FIG. 5, is selectively operable in response to presetting of hold magnets 173, 174 and 175 to provide the proper signal reference voltage for the lineal resolver 121X, FIG. 7. The fourth digit for the A register of the X axis, FIG. 3, is stored in the crossbar register by sequential energization of select magnet 153 and hold magnet 173, FIG. 5. The fifth digit is stored by sequential energization of the select magnet 154 and hold magnet 174; and, the sixth digit is stored by sequential energization of the select magnet 146 and hold magnet 175. It will be apparent that the fourth, fifth and sixth digits are dependent upon energization of the hold magnets 173, 174 and 175, respectively. The exact numerical input to be stored, however, depends upon which of the select magnets 145 to 154, inclusive, is energized immediately prior to energization of one or another of the operable hold magnets for that particular digit of input information. The 10 kc. input source 142 together with the associated transformer network represented in FIG. 5 coacts with the respective switch contacts of the crossbar switch register there shown to provide the proper sine-cosine voltage output signals for energizing the lineal resolver 121X, FIG. 7. In considering the last three digits of the number to be stored, the least significant digit thereof represents angular displacements of 0.36°, the next digit represents 3.6° steps, and the most significant digit 36° steps.

Referring to FIG. 5, windings 279 and 280 respectively represent the sine of 36° and cosine of 36°. Windings 281 and 282 likewise represent sine 36° and cosine 36°; windings 287 and 288, in turn, represent cosine 39.6° and sine 39.6°. Likewise, windings 290 and 291 represent cosine 39.6° and sine 39.6°, with the output from the last stages of the crossbar register representing the required sine-cosine voltage input for the lineal resolver 121X, FIG. 7.

At the time of storing the fourth digit, (8) for example, of a particular word of numerical data, select magnet 153 is energized to actuate the corresponding select rod 163X. As this occurs, contact 153C associated therewith is closed permitting subsequent energization of hold magnet 173. Energization of the hold magnet 173, in turn, effects movement of crossbar switch contacts 173–84 and 173–85 to complete the circuits to the windings 279 and 280. The first of these circuits is completed from conductor 303 via switch contact 173–84, a normally closed contact 78–305, to a conductor 306 extending to one terminal of the winding 279. The second of these circuits is completed from transformer tap 304, via switch contact 173–85 and a normally closed contact 78–309 to a conductor 310 connected to one terminal of the winding 280. The hold magnet 173 is retained in energized condition through a seal-in circuit via contact 173-C which is moved to closed position. The fifth digit in the numerical word 04.7891 for the X axis in FIG. 3 is nine (9). To store the fifth digit, in this case nine (9), select magnet 154, FIG. 5, is energized effecting closure of associated contact 154C to permit immediate energization of the hold magnet 174 for the fifth digit of the "AX" storage register. As this occurs, an associated normally open contact 174C is moved to closed position to complete a seal-in circuit for retaining hold magnet 174 energized, even though the select magnet 154 is subsequently deenergized. A circuit for the fifth digit control is now completed from a transformer tap 314 associated with the secondary winding of primary winding 279, extending via switch contact 174–94, normally closed contact 78–317 to a conductor 318 connected to one terminal of the winding 282. Simultaneously therewith, another circuit is completed from transformer tap 315 associated with the secondary of the primary winding 280, this circuit being completed via switch contact 174–95, normally closed contact 78–320, and a conductor 321 to one terminal of a transformer winding 281. The sixth and last available digit for X axis information is stored in the crossbar register, FIG. 5, immediately upon energization of the hold magnet 175. In the example shown for illustrative purposes in FIG. 3, the sixth digit is one (1) requiring energization of select magnet 146, FIG. 5, to actuate select rod 156X. Upon closure of associated normally open contact 146C in response to energization of select magnet 145, hold magnet 175 is energized and sealed in by closure of the associated normally open contact 175C. As this happens, a circuit is completed from a tap 324 associated with winding 287 via switch contact 175–14, normally closed contact 78–326 to a conductor 327 connected to one terminal of the winding 291. At the same time, another circuit is completed from a tap 325 associated with winding 288, via the now closed switch contact 175–15, a normally closed contact 78–329 to a conductor 330 connected with one terminal of a winding 290. In addition to energization of hold magnet 175 effecting closure of associated contact 175C to establish a holding circuit for the magnet, another normally open contact 175S is moved into closed position to indicate that all required digital input information for the X axis has been stored in the crossbar register, in this case, the A register for the X axis. Error signals from the synchro array 105X and the lineal resolver 119X are fed to the mixer discriminator 107X, the latter mixing the signals and providing a single output error signal to the error operator 109X for controlling X axis motor rotation. Upon arrival of the column in preselected position, the scale 119X and the synchros comprising the array 105X produce "null" error signals to the discriminator 107X, the latter producing a null signal to the error operator 109X for stopping movement of the X axis motor.

As shown in FIGS. 4 and 5, selected ones of the transformer taps are represented as being connected via normally closed contacts to output conductors. Actually during machine operation, this condition would not exist until all of the subsequent words of numerical data had been stored in the appropriate portions of the crossbar switch register, including where required words of data associated with columns 2 to 8 inclusive, FIG. 3. At that time, after storage of a complete line or block of information from the tape to the storage registers, all registers containing newly stored information are connected to provide a parallel read-out of the information stored. This parallel read-out does not occur, however, until two other signals are received, an end of line signal and a machine complete signal.

Thus, upon storage of a complete line or block of information, the respective switch contacts (dotted circles) in FIGS. 4 and 5, are connected by simultaneous movement of the output contacts to the output conductors that are directly connected to supply reference voltage signals to the synchro array 105X, and to the space-phase windings of the slider 120X of the lineal resolver 121X shown in FIG. 7. Thus, output 335 is connected to one of the windings 120X and output 336 is connected to the other of the windings, with the ground 334 being connected to a common ground shown in FIG. 7. It will be apparent that all of the other registers containing newly stored information will likewise be connected to supply the required read-out information, as schematically indicated in the block diagram, FIG. 2. At this time, the B register for the X axis, as shown in FIGS. 4 and 5, is not connected to the output conductors, and is available to receive the next word of command data for the X axis, as the A register is connected to effect movement along the X axis.

As represented in FIGS. 4 and 5, the digital information corresponding to the word 04.7891 for the X axis, FIG. 3, is stored in the A register of the crossbar switch, as schematically shown by the dotted circle switch contacts in FIGS. 4 and 5. The portion of the A register for the X axis shown in FIG. 4 is preset according to the first three digits (047), with the normally closed contacts extending from the switch contacts of the crossbar register connected to output conductors; the output conductors being in turn connected to supply the required voltage ratios to the three mechanically interconnected synchros shown in FIG. 7. The last three digits of the first word of information for the X axis is stored in the A portion of the register represented in FIG. 5, with the output conductors connected to supply the proper sine-cosine voltage ratios to the slider 120X of the lineal resolver 121X shown in FIG. 7. With the various switch contacts of the A register for the X axis, FIGS. 4 and 5, connected via normally closed contacts to the output conductors, the A register is actually connected to effect a machine movement in accordance with information previously stored therein.

Subsequent to storage of a word in the A register, as indicated in FIG. 3, the various words of information associated with columns 2 to 8, inclusive, are stored in one or another of the registers (A or B) appropriate for that particular machine function. To accomplish this, each of the successive registers, or portions of registers, are in turn preset by movement of the tape 135 relative to the tape reader. Presetting of the register for the Y axis, either A or B, is accomplished by effecting selective energization of select magnets 145 to 154, inclusive, to effect corresponding actuation of the Y select rods 155Y to 164Y, inclusive, in coordinated relationship with energization of the hold magnets for the A and B register of the Y axis (not shown). Inasmuch as the general mode of operation for storing digital information in the portions of a crossbar register associated with words of information for machine functions including columns 2 to 8, inclusive, is identical with the storage of information for the X axis, it is not deemed necessary to represent the various portions of the other crossbar registers in detail in the drawings. The various words of information associated with columns 1 to 8, inclusive, are represented on the tape 135 by bits of information, or transverse lines of holes upon the tape, with one bit or one transverse line of holes corresponding to each digit of information for a particular word of information. The complete block of information on the tape 135 for the first line of information on the process planning sheet 134 is represented by the coded holes extending between tab 1 and the first end of line code, reading from the left of the sheet, in FIG. 3. In all cases, the coded input information between a tab signal and the next succeeding end of line signal comprises information for one function, and is stored in the A or B register associated with that function. The end-of-line signal provides an indication that all information for that particular function has been supplied, and the next tab signal reconnects the decoding network to the next succeeding storage register. Actually, the read-out of this information after it is stored to effect machine movements does not take place until the complete block of information has been stored. As previously indicated, the parallel read-out of information stored in the several crossbar registers associated with each machine function does not occur until the control system is activated by the end of line signal, FIG. 3, and a machine complete signal.

At this time, all of the crossbar registers associated with each of the machine functions are simultaneously connected to transmit stored information to effect one or another of the various machine functions or movements. Thus, the normally closed contacts indicated in FIGS. 4 and 5 are moved into their normally closed position to effect a read-out of information.

At the completion of the read-out of the first block of stored information to effect machine movements, the tape 135 is caused to be advanced relative to the tape reader for storing the next complete block of information, in this case line 2 in FIG. 3. It is to be emphasized that during machine operation all of the A registers are not necessarily simultaneously connected to effect machine movements at the same time all of the B registers are connected to receive serial input information. In some cases, information stored during a previous portion of a machine program is used to continuously maintain the position of a particular machine element for a plurality of subsequent machining operations. In such a case, the information originally stored, whether it be in the A or B register, is connected to initially effect such a machine movement and maintain the associated member in the required position for the necessary subsequent number of machining operations or functions. Thus, the register originally connected to receive positional information for a particular major member operates to retain that associated member in selected position until the program or record from the tape, such as the tape 135, requires a change in position of that particular member. At that time, the new word of positional information is stored in the appropriate register, i.e., whichever of the A or B registers is not connected to retain a member in selected position.

After storage, the next end of line signal and machine complete signal again operates to connect the register containing the newly stored information to effect machine movements, and disconnect the other registers therefrom. The control system is so arranged that one or another of the storage registers is always available to receive new words of positional information as a new block of information is being read by the tape reader during machine movements or functions effected by previously stored information.

The crossbar switch utilized in novel manner as a numerical control storage register and represented in schematic form in FIGS. 4 and 5 may be of any standard well known type. Operation of the various switch contacts associated with each vertically disposed stack-up of contacts is illustrated in fragmentary form in FIG. 6. It is understood that the inventive principles incorporated in this invention are not restricted to a particular form of crossbar switch, since any switch capable of simultaneously effecting closure of a plurality of switch contacts in response to selective actuation of two different actuating coils may be utilized to practice the teachings of this invention. A plurality of stack-ups, each comprising a plurality of separate, simultaneously actuatable switch contacts, are disposed to be positioned in perpendicular spaced apart relationship, with one group of stack-ups being parallel to longitudinally extending select rods; and in spaced relationship to transversely disposed hold rods. For example, in FIG. 6, there are represented in fragmentary form stack-ups 336C, 336A and 336B, each of these being in parallel spaced relationship to the single select rod 155X. Each of these stack-ups is likewise in respectively spaced relationship to transversely extending hold rods, such as the hold rods 170X, 180X and 171X. In a similar manner, stack-ups 339C, 339A and 339B are disposed in parallelism to select rod 156X; and in spaced relationship to the transversely extending hold rods 170X, 180X and 171X.

The hold rod 170X is provided at its opposite ends with integrally formed circular pilot rods 170XA and 170XB respectively engaging axially aligned bored openings formed in spaced apart portions F1 and F2 of the frame for supporting the switch structure. Thus, the hold rod 170X is pivotable in a counterclockwise direction about an axis 348C upon energization of hold magnet 170 carried by the frame. Upon deenergization of the hold magnet 170, the hold rod 170X pivots in a clockwise direction about the axis 348C to its deactivated position shown in FIG. 6. An adjusting screw 170S threaded through an inwardly extending flanged portion F5 of the switch frame engages an upper face of the hold rod 170X to limit its clockwise return movement to deactivated position, as shown in FIGS. 6 and 6A.

As shown in FIG. 6A, the pivotable hold rod 170X comprises an angular plate portion 170LA interconnecting upper and lower leaf portions 170-LU and 170-LL respectively. As shown in FIG. 6, the angular plate portion 170-LA of the hold rod 170X is provided with a plurality of longitudinally spaced retangular openings, such as 341 and 314A, respectively providing clearance for a plurality of pivotably movable latch plates, such as the latch plates 345 and 345A pivotably secured to the upper face of the lower plate portion 170-LL of the hold rod 170X. Inasmuch as all of the latch plates are pivotably secured to an associated hold rod in identical fashion, only the latch plate 345 is described in detail. As shown in FIG. 6A, the latch plate 345 is pivotably secured to the lower leaf portion 170-LL of the hold rod 170X by a pin 345P. The latch plate 345 is normally retained in deactivated position by an upwardly extending resiliently mounted actuating pin 343, whenever the select magnet associated with the select rod 155X is deenergized.

The select rod 155X is provided at its opposite ends with axially aligned support pins 155-XA and 155-XB rotatably engaging bored openings formed in spaced apart portions F4 and F2 of the switch support frame for rotation about a pivot axis 145-A. The plate actuating pin 343 is resiliently secured to the upper face of the pivotable select rod 155X, and extends upwardly through the rectangular opening 341 in the hold rod 170X to engage an opening 343-OP in the pivotable latch plate 345. The select rod 155X as shown in FIG. 6, is integrally formed toward one end with a laterally extending flat plate 342 positioned below the select magnet 145, the latter being fixedly secured to the frame. Whenever the select magnet 145 is deenergized, the weight of the plate 342 causes pivotal movement of the select rod 155X to its limit of movement in a counterclockwise direction as determined by an adjustable positive stop [not shown]. With this condition existing, all of the actuating pins resiliently secured to the select rod 155X operate to retain the pivoting latch plates respectively engaged thereby in deactivated position. For example, with select magnet 145 deenergized, the select rod actuating pin 343 retains latch plate 345 pivoted to its deactuated position upon the pivotable hold rod 170X. With this condition existing, i.e., latch plate maintained in deactuated position, the switch contacts 170–01, 170–02 and 170–03 will likewise remain in deactuated open position, even though hold magnet 170 is energized to pivot the hold rods 170X and latch plate 345 carried thereby in a counterclockwise direction.

Closure of switch contacts 170–01, 170–02 and 170–03 is not effected unless select magnet 145 is energized prior to, and, as hold magnet 170 is energized. Energization of select magnet 145 urges the lateral plate 342 upwardly, thus effecting pivotable movement of the select rod 155X in a clockwise direction about its pivot axis 145A. Pivotable clockwise movement of select rod 155X effects movement of all of the control pins, including pin 343, secured thereto in a corresponding clockwise direction. Clockwise movement of resiliently secured control pin 343, in turn, effects clockwise movement of the latch plate 345 about its pivot axis 348. As this happens, the upper face of the latch plate 345 is moved under the lower end of a vertically disposed switch actuator 347 or ladder guidably constrained for vertical movement within vertically aligned openings 349 respectively formed in the switch contacts associated with the stack-up 336° C. The vertical switch actuator 347 is provided with vertically spaced abutments 350 or shoulders adapted to respectively engage the undersides of the movable switch contacts adjacent to the vertically aligned openings 349 formed therein. To constrain the switch actuator 347 against downward movement, a latch extension integrally formed with the upper abutment 350 is adapted to be frictionally engaged by an opening in the upper switch contact 170–01, and that is laterally spaced from the opening 349 formed therein. The arrangement is such that vertically upward movement of the switch actuator effects upward movement of the respective switch contacts engaged by the spaced abutments 350 into closed engagement with the stationary switch contacts such as 353, 354 and 355 extending inwardly from the adjacent stack-up 336A.

Whenever the latch plate 345 is pivoted in clockwise direction about its axis 348 in response to energization of select magnet 145, pivoting movement of the hold rod 170X and latch plate 345 in counterclockwise direction about axis 348C causes the upper face of the latch plate 345 to urge the actuator 347 upwardly to close the switch contacts. As hereinbefore explained, energization of the hold magnet 145 to close the switch contacts 170–01, 170–02 and 170–03 must occur after the select magnet 145 for the first digit of the six digit number is energized. Once closed, however, the switch contacts remain closed as long as the hold magnet remains energized, even through the select magnet is then deenergized. This is due to the underside of the upwardly moved switch actuator 347 engaging the upper face of the pivoted latch plate 345 between the two upwardly projecting tabs 345T secured thereto, as shown in FIG. 6B. With this actuated condition existing, engagement between the tabs 345T and the lower end of the upwardly urged switch actuator 347 prevents accidental return pivotable movement of the latch plate in a deactuated counterclockwise direction upon deenergization of the select magnet 145, as long as the hold magnet 170 remains energized. In other words, the tabs 345T of the upwardly pivoted latch plate coact with the lower end of the switch actuator 347 to latch the plate against accidental pivotal disengagement.

In all cases, the sequence of closing switch contacts to establish a particular preselected command reference voltage is identical and includes: [1] scanning a single line of holes on the tape; [2] actuating the tape reader switches in binary coded fashion; [3] actuating the decoding network in response to the binary coded input; [4] selecting and energizing a particular select magnet according to the coded input; [5] energizing an appropriate hold magnet to establish circuit connections for that particular digit in the cross bar storage register; [6] repeating the aforementioned five (5) steps for each digit of the first three digits of a six digit number to establish a total of nine circuit connections as illustrated in FIG. 4 and 6 for presetting command voltages to the synchro array (FIGS. 7 and 7A); [7] repeating steps similar to the first five (5) steps three additional times to complete six circuit connections through a different portion of the cross bar register to store the last three digits of the six digit input numbers as schematically illustrated in FIG. 5, thus developing coordinate reference voltages for the lineal resolver in FIG. 7.

Thus, to store a single six digit number in the A register for the X axis the hold magnets 170 to 175, respectively associated therewith are sequentially energized in coordinated relationship with the preselected energization of six of the select magnets 145 to 154 inclusive. As soon as the appropriate hold magnet is energized and sealed, the associated select magnet for that particular digit is deenergized.

As hereinbefore explained, the select magnet 145 is disposed to pivotably operate the select rod 155X for pivoting the latch plates respectively associated with stack-ups 336C, 336A and 336B, as well as the other nine stack-ups [not shown] for the X axis to condition the movable switch contacts carried by each of the stack-ups for closure upon energizing a selected one of the hold magnets 170 to 175 inclusive for the A register, or 180 to 185 inclusive for the B register. As hereinbefore explained, select magnet 145 operates to control one or another of the stack-ups for storing the numerical value zero (0). Likewise, the cooperating hold magnet 170 is adapted to be energized for storing the first digit of the six digit number represented for the first numerical word of information in the X axis, FIG. 3. In a similar manner, the hold magnet 173, FIG. 5, is adapted to be energized for storing the fourth digit of the six digit number represented in FIG. 5. Thus, whenever the fourth digit of the number to be stored in the A register for the X axis is a zero, sequential energization of select magnet 145 and the fourth digit hold magnet 173 operates to effect closure of the fourth and fifth level switch contacts in a stack-up [not shown], but indicated schematically in FIG. 5 as intersecting points 174–04 and 174–05. In addition to stack-ups 336C, 336A and 336B, it will be apparent that seven additional stack-ups [not shown] are disposed in spaced parallel relationship to the pivotable select control rod 155X. In like manner, seven additional stack-ups [not shown] are disposed in spaced parallel relationship to the pivotable select rod 156X and the stack-ups 339C, 339A and 339B. To further illustrate the structural configuration of the X axis cross bar switch, select magnet 147 is represented in phantom as being positioned to pivotably actuate the associated select rod 157X for pivoting a resiliently secured select control rod 343F for pivoting the latch plate associated with stack-up 340B.

In a complete portion of the cross bar switch for storing X axis information, ten (10) select magnets, such as select magnets 145 and 146 are carried in spaced rectilinear relationship; and, at right angles to twelve (12) hold magnets, such as hold magnets 170 and 180. Likewise, ten pivotable select rods, are respectively associated with corresponding select magnets, such as select rods 155X, 156X and 157X, in parallel spaced relationship; and at right angles to twelve (12) pivotable hold rods, such as hold rods 170X, 180X and 171X, which are carried in parallel spaced relationship relative to corresponding actuating hold magnets.

In other words, as represented in fragmentary form in FIG. 6, ten (10) select rods are disposed in perpendicular relationship to twelve (12) hold rods in a grid like pattern, with a stack-up being carried in operative arrangement above each intersecting crossover point of the perpendicular hold rods and select rods. Inasmuch as ten select magnets 145 to 154 inclusive are represented as actuating common select rods 155X to 164X inclusive, switch contacts in levels 1, 2 and 3 are utilized for the first three digits and switch contacts associated with levels 4 and 5 are utilized for the last three digits to achieve the necessary isolation between the command signals emanating from the transformer input sources 141 in FIG. 4 and 142 in FIG. 5. The various hold magnets and associated stack-ups for the second, third, fourth, fifth and sixth digits of the number to be stored are not represented in FIG. 6, although the mode of operation is identical with the illustrated hold magnets 170 and 180 for the first digits of the A and B register for the X axis respectively.

As hereinbefore explained and as schematically shown in FIGS. 4 and 5, select magnets 145 to 154, inclusive, are respectively energizable to store numerical values of 0 to 9, inclusive. For storing the numerical value one (1) as the first digit of a six digit number in the A register for the X axis, the stack-up 339C represented in a fragmentary form in FIG. 6 is adapted to be actuated to close the first three levels of switch contacts 170–11, 170–12 and 170–13 upon sequential energization of the select magnet 146 and the first digit hold magnet 170. In the event, therefore, the first digit of the number to be stored in the register for the X axis is a one (1) instead of a zero (0), stack-up 339C would be actuated instead of stack-up 336C.

The switch contacts 170–01, 170–02 and 170–03 are carried in vertically spaced relationship between insulating blocks 371, by the stack-up 336C as hereinbefore explained. In similar manner, the output contacts 353, 354 and 355 are carried in vertically spaced relationship between insulating blocks of an adjacent stack-up 336A. Thus, each stack-up comprises a vertically laminated column having a plurality of stationary switch contacts extending in one direction and being alternately spaced with respect to a plurality of movable switch contacts extending in the opposite direction. An insulated spacer block, such as the blocks 371 is provided between each stationary switch contact and each movable switch contact. Output contacts 353, 354 and 355 are respectively connected by conductors 377, 378 and 379 to common switch connectors 170–1, 170–2 and 170–3. With the contacts 78–190 and 78–194, FIG. 4, in normally closed condition, the contacts 353 and 354 are conditioned to complete the circuits from switch contacts 170–01 and 170–02 to output conductors 191 and 195 for the first digit of the six digit command signal. Inasmuch as the control rod 343 is resiliently secured to the select rod 155X, subsequent deenergization of the select magnet 145 has no effect upon movement of the latch plate 345 which is retained both in its clockwise and upwardly pivoted counterclockwise position to retain actuator 347 in upward position by continued energization of the hold magnet 170.

In a similar manner to that hereinbefore described, the remaining five digits of the six digit input are stored by sequential energization of the select magnet and the appropriate one of the cooperating hold magnets. In all cases, storage of a complete word of information, comprising the six digit number for the X axis, is not completed until six of the hold magnets for a particular register are energized and retained in energized condition to actuate six separate stack-ups, the stack-ups varying according to the particular select magnet that is energized for the numerical value of each digit in the word being stored.

As explained with reference to FIG. 3, the digital words of numerical command information from the process planning sheet are applied to the eight channel tape 135 constituting a storage medium in the form of binary coded punched holes, with one transverse line of holes or bit of information on the tape being utilized for each digit in the command word. As the punched tape 135 is advanced relative to the tape reader, tape reader switches are actuated in binary coded fashion, as will hereinafter be more fully described, to provide an input of decimal information into the crossbar storage register (A or B). The decimal input information to the crossbar register which is effected by sequential energization of the six hold magnets, after the appropriate numerical value select magnet is energized, presets the crossbar register according to the binary coded word of information received from the punched tape 135, FIG. 3. After the crossbar register (A or B) is preset by decimally applied input information, the various output conductors therefrom are adapted to provide predetermined sine-cosine voltage ratios for respectively energizing the digital synchro array 105X and the lineal resolver 121X, FIG. 7. It will be apparent, therefore, that the binary coded information from the punched tape is converted by the decoding network 59, FIG. 2, into decimal information to selectively activate the various select and hold magnets of the crossbar register, FIGS. 4 and 5. The crossbar register either A or B for the X axis is thus operative to constitute a medium for translating decimal input information to an analogue output. In a similar manner, the A and B storage registers respectively associated with the Y axis, Z axis, feed rate, spindle speed and table index are adapted to provide an analogue output for effecting predetermined operation of these various machine functions according to decimal input information received from the decoding network 59, FIG. 2. Information for tool select and auxiliary function (for example, tool change function) in FIG. 2 require merely a predetermined switching function to initiate the required machine movement. Thus, with these particular functions, no analogue output from the associated storage registers is provided. For both the tool select and auxiliary functions, binary information from the tape reader 58, FIG. 2, is transformed into decimal information by the decoding network 59 which is then operative via tabs 6 or 7 to preset a binary coded number in the associated storage registers. It is not deemed necessary to describe in detail the exact means for decimally setting the crossbar register, such as the A and B registers for other forms of required output information. It will be readily apparent that this can be accomplished by substituting a slightly different input information for the 400 cycle input shown in FIG. 4 and the 10 kc. input represented in FIG. 5. It will likewise be clear that a crossbar switch utilized as a storage medium for decimal input information as represented in FIGS. 4 and 5, can be considered as a translation device for converting decimal input to an analogue output, decimal input to a binary coded output, or decimal input to a decimal output in accordance with the output command information required for initiating and effecting various machine functions.

With command voltages being supplied from the A register for the X axis of the crossbar switch, FIGS. 4 and 5, reference voltages are continuously supplied to the three (3) synchros comprising the digital synchro array 105X, FIG. 7, and to the lineal resolver 121X. With this condition existing, an error signal which is supplied from the error operator 109X is maintained in continuous control of the servo amplifier to control the power actuator 115X, FIGS. 2 and 7, as long as the upright 28 is to be maintained at the selected position during subsequent machining operations. Assume now that the upright 28 is in a different position along the frame 23 than that required, at the moment the reference voltages from the A register of the X axis are simultaneously connected to provide a reference voltage to the several synchros and lineal resolver as heretofore explained. As this occurs, error voltages are available from the respective rotor windings 199R, 228R, 220R and the resolver scale winding 119X. The magnitude of each error voltage is a function of the angular displacement of the respective rotors from their zero error positions, i.e., equivalent to the respective reference voltages from the crossbar register. Thus, the error operator 109X provides a resultant signal to activate the servo amplifier 112X for effecting the required extent of movement of the power actuator 115X in the required direction. As the power actuator 115X effects the required movement of the upright 28 to the required preset position, a switching take-over network (not shown) in the mixer discriminator 107X provides a gradual switchover of the error signals from the coarse, medium and fine synchros respectively, as the rotors of each of these synchros approaches its zero error position. Upon arrival of the upright 28 to a position within ten to twenty thousandths (.010 to .020) of the finally selected position, an error signal from the scale winding 119X supplied via output conductors 293, 294 to a discriminator 122X, predominates and controls the output from the error operator 109X until the upright 28 reaches the finally selected position. In other words, as the error output signal from the coarse synchro 198 approaches a low level, near its zero error position; the output from the medium positioning synchro 208 then takes over until its rotor 228R assumes an angular position close to its ultimate zero error position, at which time the error output signal from the fine positioning synchro 212 takes over; at the rotor winding 220R in turn approaches its zero error position, the output from the winding of the scale 119X takes over to effect final, fine positioning of the upright to its exact selected position. At this time, the respective rotors of all of the positioning synchros and the scale winding 119X will be in their respective zero error positions to provide a signal to the synchro amplifier 112X for retaining the power actuator 115X in its finally selected position. It is not deemed necessary to explain in detail the take-over switching network interconnected between the various positioning synchros of the synchro array 105X, since such switching networks are commercially available. An important advantage of this invention, however, is the fact that the final error signal from the resolver discriminator 122X is continuously available to the error operator 109X, thus effecting a continuous dynamic control over the final position of the upright 28. In a similar manner, the various synchros and resolvers associated with the Y axis, the Z axis, and the index table 46 maintain continuous control over the error operator to effect movement, and final positioning of the various members associated with these axes. Upon arrival of the respective major members including the upright 28, the saddle 29, the spindle head 37, and index table 46 at selected position, a signal control error relay (not shown) respectively associated with each of these axes of movement is actuated to, in turn, effect actuation of a machine error relay control 415, FIG. 11, to provide a signal for effecting subsequent actuation of a machine complete signal. In other words, a separate error relay is associated with each of the machine functions to be performed. As each function called for by command signals from the connected storage register is completed, the error relay associated with that function is actuated. For simplicity, the error relays responsive to completion of the several machine functions have been schematically indicated on FIG. 11 of the drawings as the box 415.

Figure 8:
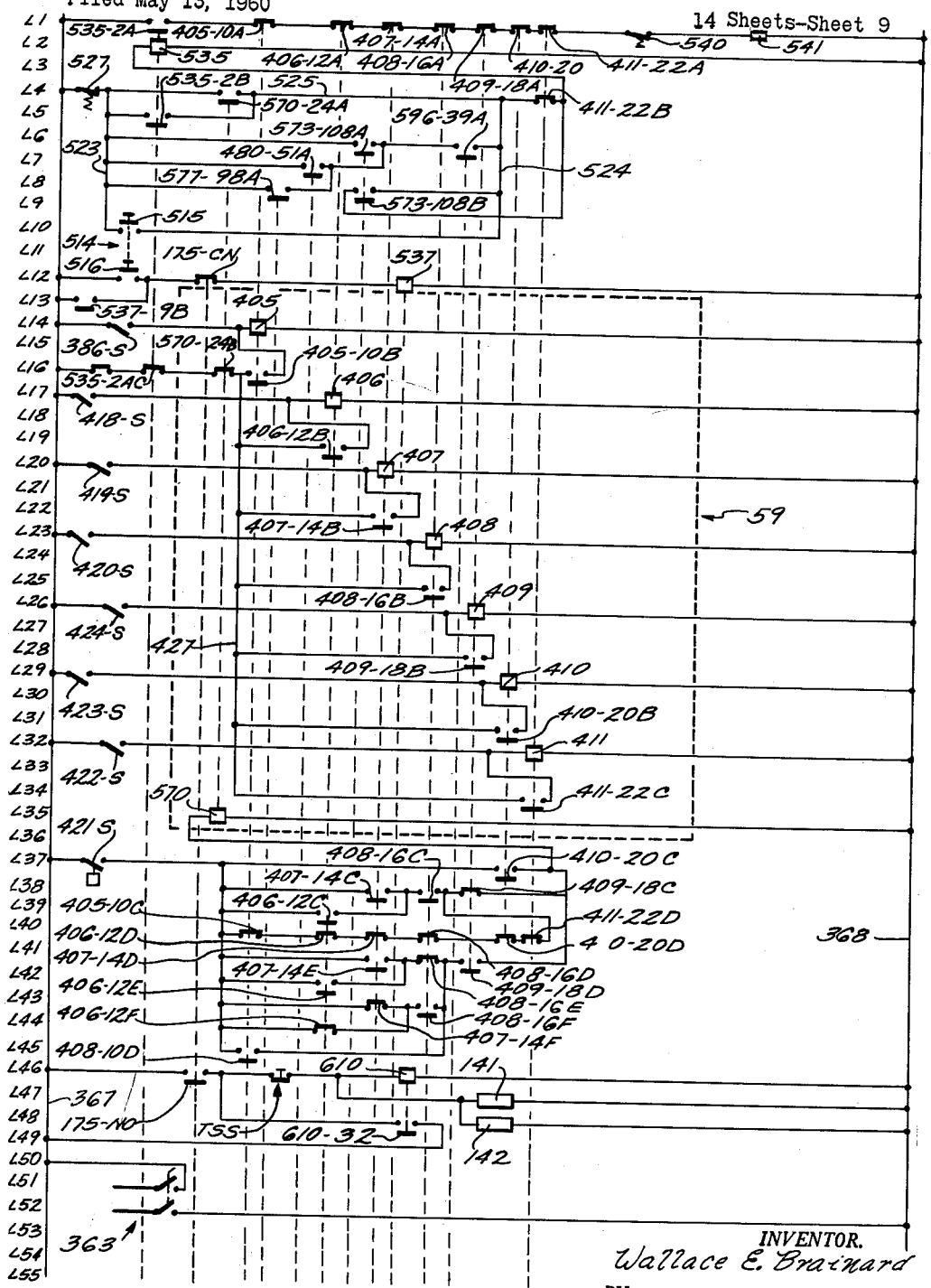

The control circuit for storing information in the crossbar switch registers in response to a program of machine movements from a record, as well as for effecting subsequent operation of machine functions, is diagrammatically shown in FIGS. 8, 9, 10 and 11. As shown in FIG. 8, energized conductors are connectable by actuation of a switch 363 to energize conductors connected to energize the control circuit supply conductors 367, 368.

For transmitting information from the record comprising the binary coded punched tape 135, there is provided the tape reader 58 as schematically shown in FIGS. 12 and 13. The tape reader 58 is under the control of an input power shaft 373 disposed in well known manner to be continuously driven by a motor (not shown) and which is engageable by means of a clutch 374 to drive a power transmitting, mechanical type coupling device schematically indicated at 375, for effecting coordinate rotation of a cam shaft 380 and a tape engaging sprocket 381. The coupling device 375 is provided with a lost motion drive mechanism in a manner that the cam shaft 380 is disposed to rotate a cam 380A that operates a pivot arm 382 journalled about an axis 383 to move a pin support body 385 and a tape engaging pin 386 from engagement with a punched hole in the tape 135, prior to the sprocket 381 effecting advancement of the tape 135 relative to the tape reader guide plates 389 and 390. The arrangement is such that during each 360° counterclockwise revolution of the cam shaft 380, the cam 380A is rotated in like direction from the position shown in FIG. 12 to a like position.

As shown in FIG. 12, the pin 386 secured to the support body 385 is in engagement with one of the punched holes provided in the tape 135. It will be apparent that prior to advancement of the tape 135, the cam shaft 380 operates to urge the rightward end of pivot arm 382 upwardly in opposition to biasing spring 384 in a manner that the pin 386 is completely withdrawn from engagement with the punched hole in the tape prior to, and during advancement of the tape to position the next transverse row of punched holes presented by the tape in exact alignment with the tape reading pins, such as the pin 386. Each of the eight tape reading pins is disposed to engage one of the punched holes in the tape, the latter comprising channels one (1) to eight (8), inclusive, as shown in FIG. 13. Each of the eight pins operates in a manner similar to the pin 386, FIG. 12, and each of them is secured to separate vertically reciprocable pin bodies (not shown) constrained for rectilinear movement, such as the pin body 385 for downward movement and disengagement from the tape, by rotation of the common cam shaft 380. Unless a hole is present in the transverse row or bit on the tape that is indexably aligned with the tape reading pins, that particular pin will remain in downward disengaged position, thereby effecting no closure of a normally open switch, associated with each of them.

Figure 9:
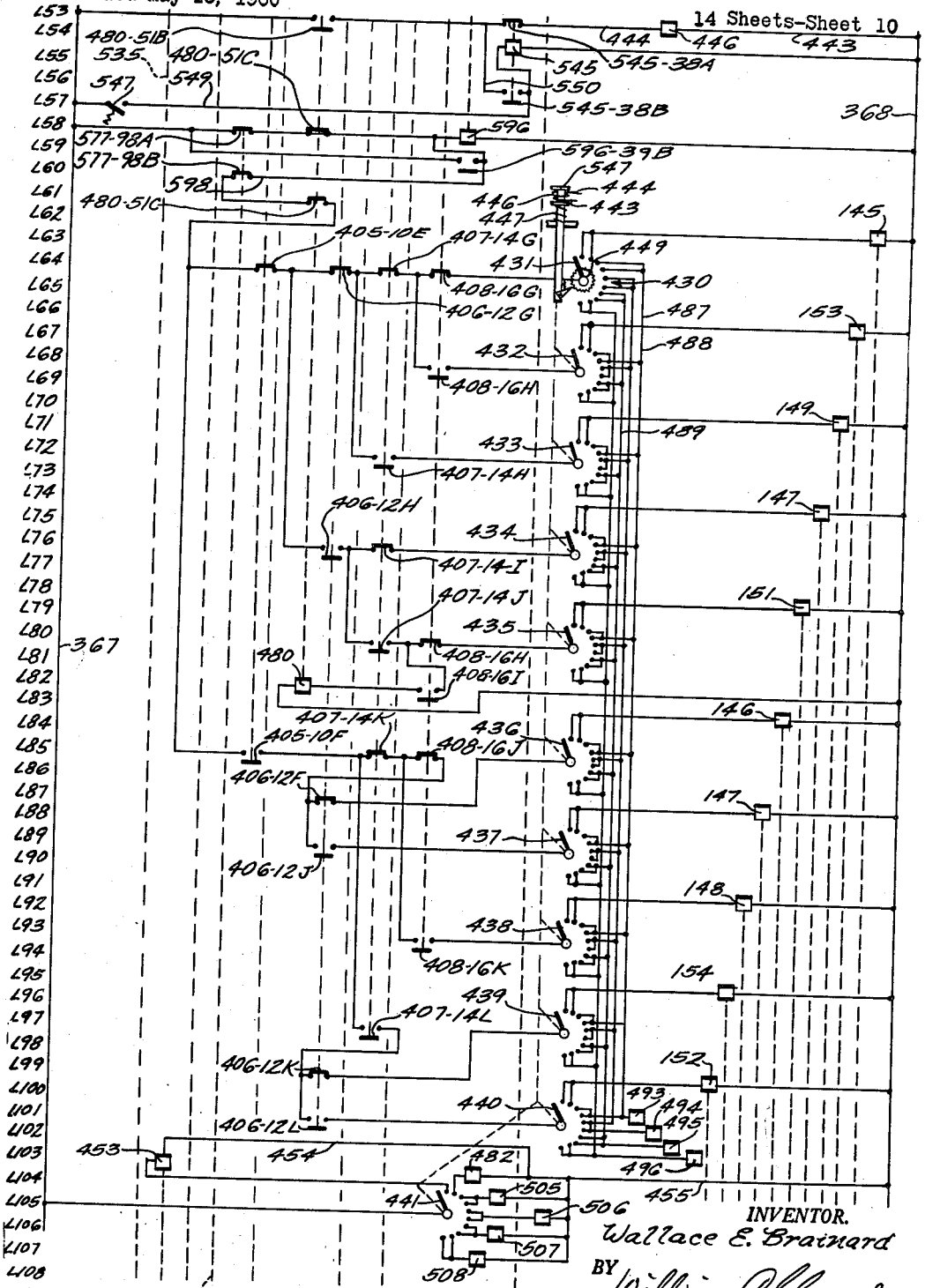

As represented in FIG. 13, the tape reader is provided with the pin 386 and pins 418 to 424 inclusive, which operate in coordinated relationship, as the clutch 374 is engaged to successively index each bit of information presented by the successive rows of holes on the tape into alignment therewith. In other words, movement of one or another of the reading pins into engagement with an appropriately spaced punched hole on the tape 135 causes closure of one or another of the associated contacts represented in FIG. 8, lines L14, L17, L20, L23, L26, L29 and L32. Coded operation of the reading pin switch contacts 386–S, 418–S, 419–S, 420–S, 422–S, 423–S, and 424–S effects energization of one or another of the decoding relay coils 405 to 411 inclusive. No switch contact is represented by reading pin 421, which is aligned with the parity check channel five (5), as the operation of this pin is not directly concerned with the storage of coded information in the crossbar registers. Upon actuation of a switch contact, for example, switch contact 386–S to closed position, a circuit is completed from energized line 367 along horizontal line L14 to switch contact 386–S to energize a coil 405, the circuit being completed to energized line 368. Upon energization of coil 405, a seal-in circuit is completed via closure of an associated contact 405–10B interconnected via normally closed contact 570–24B and normally closed contact 535–2AC to the energized line 367 The decoding coils 405 to 411 inclusive, FIG. 8, comprise the decoding network 59 schematically shown in FIG. 2 and are disposed to operate associated contacts represented in FIG. 9, the associated contacts being disposed to be actuated in code fashion. For each bit of information from the tape reader 58, FIGS. 12 and 13, circuits are completed to energize one or another of the decoding relay coils 405 to 411 inclusive; and, consequently, the coding circuits are then established by operation of the associated decoding contacts, FIG. 9, to one or another of the wiper arms associated with the stepping switch 430 for controlling energization of the select magnets. As shown in FIG. 9, ten of the wiper arms 431 to 440 inclusive are connectable to transmit bits of information from the decoding network to one or another of the select magnets 145 to 154 inclusive for storing information in the A or B registers associated with the X axis, as well as the A or B registers for the Y axis and the registers for effecting control of the other functions.

The eleventh wiper arm 441 which is connected to be moved simultaneously with the ten wiper arms for the various select magnets, is operative upon stepping movement to select the appropriate bank of hold magnets, that operate in conjunction with the particular select magnets simultaneously selected by the first ten (10) stepping switch wiper arms for storing information in either the A or B register associated with that particular machine function. As presently indicated in FIG. 9, all of the wiper arms 431 to 441, inclusive, of stepping switch 430 are shown in a neutral, home position in which none of them is connected to transmit coded information to either the select magnets or the hold magnets. Initially, therefore, to store information it is necessary to energize conductors 443 and 444, to energize a coil 446, thus forcing a pawl carrying arm downwardly relative to a ratchet 449 carried for rotation with the first wiper arm 431. Upon deenergization of the coil 446, a spring 447 urges the arm and pawl upwardly to advance the ratchet 449, and cause all of the wiper arms 431 to 441, inclusive, to index one step in clockwise direction into positions engaging the first bank of contacts, positioned one step rightwardly in a clockwise direction from the home position. With the wiper arms 431 to 440, inclusive, in the first position, each of them is interconnected between the contacts respectively associated with one or another of the code actuated relays 405 to 411, inclusive, FIG. 8, and one or another of the select magnets 145 to 154, inclusive, associated with the A and B registers for the X axis, as described in connection with FIGS. 4 and 5.

Figure 10:
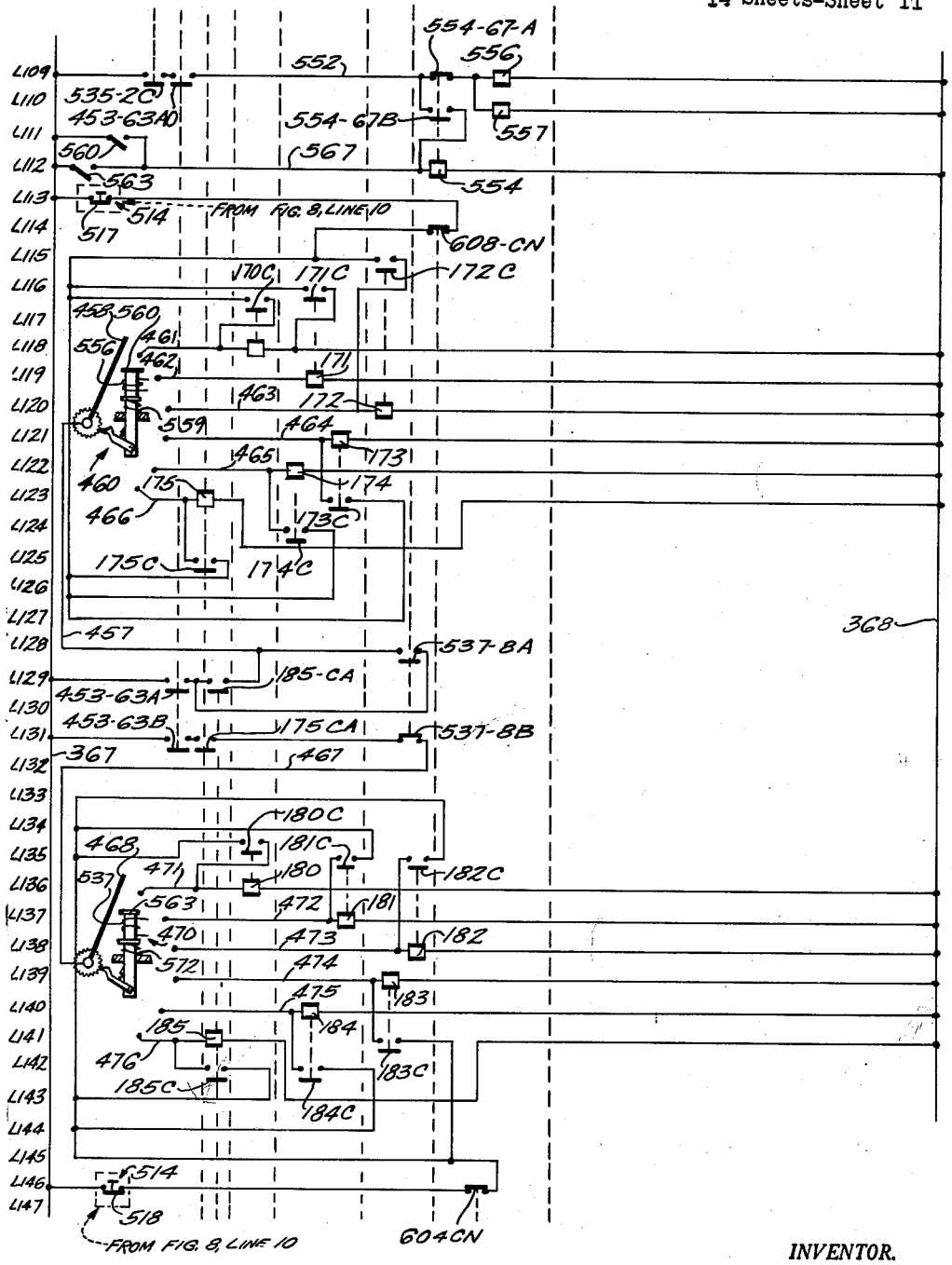

At the same time, the wiper arm 441 is advanced to its first position to complete a circuit form energized conductor 367 along horizontal line L105, and thence via the first associated stepping switch contact to energize a coil 453, this circuit being completed via conductor 454 and 455 to energized conductor 368. Upon movement of coil 453 to energized closed position, associated contacts shown in FIG. 10, are moved to closed position. Contact 453-63A is interconnected along horizontal line L129, FIG. 10, via a closed contact 537-8A of energized cycle start relay 537 leading to a conductor 457, and thence to a wiper arm 458, shown in home position, associated with an A register stepping switch 460. The six active contacts of stepping switch 460 are respectively connected by means of conductors 461 to 466, inclusive, to the hold magnets 170 to 175 associated with the A register for the X axis as heretofore described in connection with FIGS. 4 and 5.

In a similar manner, the other normally open contact 453-63B that is moved to closed position upon energization of coil 453, FIG. 9, is interconnected between conductor 367 along a horizontal line L131, FIG. 10, and a conductor 467. The circuit to conductor 467 cannot be completed, however, until the contact 537-8B is returned to its normally closed position and the normally open contact 175CA is moved to closed position upon energization of the last digit hold magnet 175 for the A storage register. The conductor 467 is connected directly to the wiper arm 468 associated with a B register stepping switch 470 for the B register of the X axis. The six active contacts sequentially engageable upon stepping movement of wiper arm 468 of switch 470, are respectively connected by conductors 471 to 476, inclusive, of the six hold magnets 180 to 185, inclusive, for the B register of the X axis, as hereinbefore described with reference to FIGS. 4 and 5.

As will hereinafter be more fully described, one or the other of stepping switches 460 or 470, FIG. 10, is actuatable to effect sequential energization of the associated six hold magnets for the A or B register in coordinated relationship with energization of one or another of the select magnets 145 to 154, inclusive, in FIG. 9, depending upon whether information is to be stored in the A or the B register for the X axis.

Thus, the wiper arm 441 associated with stepping switch 430, FIG. 9, operates to select an appropriate group of hold magnets to be coordinately energized with the proper select magnets for a particular machine function or movement, in the described condition for the X axis. Actually, the wiper arms 431 to 441, inclusive, in FIG. 9 are retained in engagement with each of the active contacts, until a complete word of numerical data is stored in an appropriate one of the storage registers. As hereinbefore explained, a numerical word of information for the X axis requires six separate digits or individual bits of information. Thus, as input information is transmitted from the tape reader 58 in serial input form, each word of six digit information for the X axis requires six separate closures of the reading pin contacts 386S, 418S, 419S, 420S, 422S, 423S and 424S, to in turn provide six distinct energizing pulses to one or another of the decoding relays 405 to 411, inclusive, in FIG. 8.

At the same time, the relay contacts represented in FIG. 9 as being associated with the respective relays 405 to 411, inclusive, are likewise actuated six times, depending of course upon the numerical value of the digit being stored, to effect an appropriate energization of one or another of the select magnets 145 to 154, inclusive, and a sequential energization of the hold magnets 170 to 175, inclusive, if information is being stored in the A register of the X axis. It will be readily apparent, therefore, that one of the stepping switches such as the A register switch 460 in FIG. 10, is sequentially stepped six times corresponding to the digits of information to be stored, during which time, the wiper arms 431 to 441, inclusive, of the stepping switch 430 in FIG. 9, are continuously maintained in engagement with the first bank of contacts respectively connected to the ten select magnets, and the relay coil 453.

At the completion of storing one six digit word of information for the X axis, in either the A or B storage registers, the next bit of information on the tape 135, as shown in FIG. 3, comprises a tab signal. Thereupon, the reading pins in FIG. 13 are so activated by the tab signal as to effect a corresponding tab signal by closure of the appropriate reading pin contacts, FIG. 8, to effect energization of the required ones of the decoding relays 405 to 411, inclusive. As this occurs, the associated decoding relay contacts in FIG. 9 are actuated to complete a circuit for energizing a tab control relay 480, interconnected in line L82 in FIG. 9.

Energization of the tab control relay 480, in turn, is connected to effect energization of the coil 446 of the stepping switch 430 for effecting a consequent single step advancement of the wiper arms 431 to 441 associated therewith into engagement with the second bank of contacts, spaced rightwardly in a clockwise direction from the home position. With wiper arms 431 to 440 advanced to the second active position, it will be noted that each of these wiper arms is still retained in engagement with the conductors leading to the various select magnets 145 to 154, inclusive. As hereinbefore explained with reference to FIG. 5, it will be recalled that the select magnets 145 to 154, inclusive, are energizable to effect actuation of corresponding select rods 155Y to 164Y, inclusive, represented in fragmentary form as being associated with another portion of the crossbar switch register for storing Y axis information. At the same time, the wiper arm 441 associated with the stepping switch 430 in FIG. 9 is advanced into engagement with the second active contact to effect energization of a relay coil 482, connected via conductor 455 to energized line 368. Energization of relay coil 482, in turn, is operative to condition a pair of stepping switches (not shown) operative to control selective sequential energization of A register hold magnets and B register hold magnets (not shown) that are adapted to be associated with that portion of the crossbar switch register (not shown) that is connected to be controlled by the selective operation of select rods 155Y to 164Y, represented in fragmentary form in FIG. 5.

The arrangement for storing a six digit word of numerical data, corresponding to the six separate bits of information on the tape 135 in FIG. 3 for the Y axis is identical to the arrangement hereinbefore described for storing X axis information. Therefore, it is not deemed necessary to show or describe in detail the dual stepping switch arrangement for the Y axis hold magnets, which are operable in sequential manner upon stepping movement of one or another of a pair of stepping switches (not shown) similar to those represented in FIG. 10. It is emphasized, however, that wiper arms 431 to 440, inclusive, associated with stepping switch 430 are connected during six sequential pulses of energization to actuate one or another of the select magnets 145 to 154, inclusive, in coordinated relationship with sequential actuation of an appropriate bank of A or B register hold magnets (not shown) for the Y axis.

Referring again to FIG. 3, at the completion of storing a six digit word of Y axis information, another tab signal comprising a bit of five holes punched on the tape 135 is provided to initiate the next tab signal for energizing the tab control relay 480, FIG. 9. As this occurs, the coil 446 of stepping switch 430 is again energized, and upon deenergization effects stepping movement of the associated wiper arms 431 to 441, inclusive, to their third active positions. To further simplify the description, the third and fourth banks of contacts associated with wiper arms 431 to 440, inclusive, of stepping switch 430 are represented as being connected to a common conductor 487 connected to a rectangular box 493, disposed to schematically represent select magnets for the Z axis, depth control and feed rate, respectively, represented in columns 3 and 4 of the process planning sheet 134 in FIG. 3. In a similar manner, contacts 5 and 6, in FIG. 9, are connected via a common conductor 488 to a rectangular box 494 disposed to represent a set of select magnets for the spindle speed control and tool select functions, corresponding to columns 5 and 6 in the process planning sheet 134 in FIG. 3. Likewise, columns 7 and 8, respectively designated as auxiliary function and table index, FIG. 3, are controlled by select magnets contained within rectangular box 495 connected by a common conductor 489 to the seventh and eighth contacts associated with the stepping switch wiper arms in FIG. 9. To illustrate the fact that any number of different machine functions may be programmed in response to numerical input data, a fourth rectangular box 496, is represented in FIG. 9 as being connected to contacts 9 and 10 of the stepping switch 430. Actually, no functions corresponding to contacts 9 and 10 associated with the stepping switch 430 are provided or illustrated on either the process planning sheet 134 or programmed on the tape 135 in FIG. 3. It will be readily apparent, however, that provision for such additional machine functions or movements may be readily made and programmed directly on the tape in a manner that numerical input data may be stored in an appropriate storage register having a set of ten select magnets schematically represented as hereinbefore explained as being contained within the rectangular box 496 illustrated in FIG. 9.

Likewise, to simplify the description, contacts 3 and 4 associated with the eleventh stepping switch wiper arm 441 in FIG. 9 are connected to a rectangular box 505, representative of two control relays, such as the relays 453 and 482 associated with contacts 1 and 2, in a manner that stepping switch contacts 3 and 4 likewise are operative via switch wiper arm 441 to control separate banks of hold magnets (not shown) that are coordinately operative in timed relationship with the select magnets represented in the rectangular box 493. Contacts 5 and 6 associated with wiper arm 441 are connected to energize a common control 506, that is likewise deemed the equivalent of the two separate relays such as those previously described as associated with contacts 1 and 2. In similar manner, contacts 7 and 8 control separate relays (not shown) within box 507, each relay (not shown) being adapted to control separate banks of hold magnets; and, contacts 9 and 10 associated with wiper arm 441 are represented as controlling two relays (not shown) contained within a box 508, in a manner to control two separate sets of hold magnets, each set of hold magnets being respectively operated in conjunction with select magnets represented in box 496.

At the completion of storing each successive numerical word of informational data respectively associated with functions initiated by contacts 3 to 10, inclusive, of the stepping switch 430 in FIG. 9; a tab signal initiated by momentary energization of the tab control relay coil 480, horizontal line 51, effects energization of stepping switch coil 446 to advance the associated wiper arms 431 to 441, inclusive, into engagement with the next bank of contacts in the stepping switch. The arrangement for effecting a single step movement of the wiper arms 431 to 441 inclusive of switch 430 associated with stepping switch 430 is identical to that hereinbefore described for advancing the wiper arms from active contact No. 1 to active contact No. 2, and thence, at the completion of storing Y axis information, advancing the wiper arms to contacts No. 3.

Thus, at the completion of storing the required information for each of the machine functions respectively associated with contacts 3 to 10, inclusive, FIG. 9, the tab control relay 480 is energized to step the wiper arms 431 to 441, inclusive, into engagement with the next bank of contacts for proceeding with storing the next portion of serial input information from the tape in the appropriate storage register associated with that particular machine function. At the completion of storing a line of information corresponding to a block of information on the tape 135, FIG. 3, an end of line signal from the tape is automatically operative to step the wiper arms 431 to 441, inclusive, FIG. 9, back into home position, a subsequent tab signal being again operative to move the wiper arms into engagement with the first bank of contacts on the stepping switch 430 to again store information in the appropriate register for the X axis.

It will be assumed that the wiper arms have been stepped successively through the series of ten contacts to store the appropriate required information in registers associated with each of the machine functions, and the respective wiper arms are now returned into engagement with the first bank of contacts presented by the stepping switch, to respectively be in position to energize select magnets 145 to 154, inclusive, for storing information in the A or B registers associated with the X axis. At the same time, the wiper arm 441 will likewise be moved into engagement with the first active contact to complete a circuit for reenergizing relay coil 453, again effecting closure of the associated contacts shown in FIG. 10. At this time, therefore, one or another of the stepping switches 460 (A register) or 470 (B register) will be conditioned for coordinate operation of the associated six hold magnets subsequent to sequential energization of six of the select magnets, FIGS. 4, 5 and 8. As the tape is again advanced relative to the tape reader, successive words of numerical information for each function are again caused to be stored in the appropriate crossbar switch storage registers.

It will now be assumed that no information is stored in either of the A or B registers for any of the axes of machine movement, or any of the other machine functions, and that a binary coded tape is in position with respect to the tape reader 58, FIGS. 12 and 13, to start a preselected program of machining operations. With this condition existing, the wiper arms associated with the select magnet stepping switch 430, FIG. 9, as well as the wiper arms associated with stepping switches 460 and 470, FIG. 10, are in home position, i.e., the first position in a counterclockwise direction from the first banks of active contacts respectively associated with the stepping switches. It will further be assumed that switch 363 is closed to energize conductors 364 and 365 for energizing conductors 367, 368 of the complete control circuit diagrammatically illustrated in FIGS. 8, 9, 10 and 11.

With these conditions existing, a cycle start switch 514, shown opposite line L10 in FIG. 8, is depressed to move associated contacts 515 and 516 to momentarily closed position. Cycle start switch 514 represented in FIG. 8 is likewise provided with additional normally closed contact bars 517, 518, represented in lines L113 and L146 in FIG. 10, as well as normally closed contact bars 519, and 520; represented in horizontal lines L147 and L170 in FIG. 11. It will be apparent, therefore, that actuation of cycle start switch 514 effects momentary movement of normally open contacts 515, 516 to closed position, and simultaneously therewith, normally closed contact bars 517, 518, 519 and 520 to momentary open position. Movement of the associated normally closed contact 517, line L113 in FIG. 10, operates to interrupt the seal-in circuit to the six hold magnets associated with the A register for the X axis, thereby insuring that the A register is cleared of information prior to initiating a new program of machine movements. Movement of normally closed contact 518, line L146 in FIG. 10, is operative to interrupt the seal-in circuit for the six hold magnets 180 to 185, inclusive, associated with the B register for the X axis, thereby insuring that the B register is cleared of all information at the time of initiating the next programmed cycle of machine operations. In like manner, movement of normally closed contacts 519, and 520; respectively associated with cycle start switch 514 in horizontal lines L147 and L170 in FIG. 12; are operative to insure that the associated control relay coils are deenergized at the start of a cycle of machining movements. Momentary closure of contact 515 of cycle start switch 514, FIG. 8, completes a circuit from energized conductor 367, via a normally closed resiliently biased switch contact 527, in L4 in FIG. 8, associated with the tape reader 58, FIG. 12, to a vertical conductor 523, closed contact bar 515 to a vertical conductor 524. From the vertical conductor 524, the energized circuit continues to a conductor 525, horizontal line L4, and thence via a normally closed contact 411–22B of the end-of-line control relay 411 in line L32 to energize a read-complete relay coil 535 L2, the circuit being completed to energized conductor 368.

At the same time, closure of the second contact bar 516 of cycle start switch 514, horizontal line L12, completes a circuit from energized conductor 367, via the momentarily closed contact bar 516, and thence via a normally closed contact 175–NC associated with the last hold magnet of the A register for the X axis to energize a cycle start relay coil 537, the opposite terminal of which is connected to the energized conductor 368. Energization of the cycle start relay coil 537 effects closure of a normally open assoicated contact 537–9B, horizontal line L13, to complete a seal-in circuit for retaining the coil 537 energized until the last hold magnet 175 of the A register, FIG. 5, is energized signifying that a complete six digit word of numerical data has been stored in the A register of the X axis; thus effecting movement of the normally closed contact 175–NC, line 8 in FIG. 8, to open position to deenergize the cycle start relay coil 537.

The relay coil 537, therefore, is retained in energized condition only during the storage of the first six digit word of information for the X axis, after which it is deenergized during the remainder of the program of information supplied by the control tape. Upon energization of the read-complete relay 535, line L2, an associated normally open contact 535–2B in line L5 is closed to complete a seal-in circuit for retaining relay coil 535 energized. Another normally open contact 535–2A, line L1, is energized to complete a circuit from energized conductor 367 via a plurality of normally closed contacts respectively associated with the now deenergized decoding relay coils 405 to 411, inclusive; and, thence via another normally closed contact 411–22A, associated with the end of line control relay 411; via another normally closed contact 540 associated with the tape reader 58 to energize a clutch control relay coil 541, this circuit being completed to energized conductor 368. Energization of the relay coil 541 is operatively connected to effect engagement of the reader control clutch 374, FIG. 12, for effecting a single step advancement of the tape 135 to bring the next bit of coded information contained thereon into exact alignment with the tape reader reading pins, such as the pin 386, which are retracted during this interval. As is well known, the commercially available tape readers, such as the reader 58, are provided with automatically operative normally closed switch contacts, such as the contacts 527 and 540 shown resiliently biased to closed position in horizontal lines L4 and L1 respectively, FIG. 8. The arrangement is such that energization of the clutch control relay 541 initiates a single step advancement of the tape reader sprocket 381, FIG. 12, by engaging the tape reader control clutch 374. During this advancement, and prior to its completion, both of the normally closed switch contacts 527 and 540, FIG. 8, are momentarily moved to open circuit interrupting position by means of a control cam (not shown) thus interrupting the seal-in circuits to both the read-complete relay coil 535 and the coil 541 in FIG. 8. Inasmuch as the cycle start switch 514 has likewise been returned to its normally open position during this interval, movement of switch contact 527 to momentary open position interrupts the seal-in circuit to relay coil 535.

Actually, for each successive single step advancement of the tape for positioning each bit of information on the tape in a position to permit selective actuation of the reading pins, there is provided a sequential energization of the read-complete relay coil 535 and the clutch control relay coil 541, FIG. 8. As this occurs, upon energization of read-complete relay 535, an associated normally open contact 535–2B, horizontal line L5, is closed to complete a momentary shunt circuit via the still closed, cam actuated reading switch contact 527 to conductor 525 thereby retaining read-complete relay 535 energized. Simultaneously therewith, the other normally open contact 535–2A, horizontal line L1, is closed to effect completion of a circuit via the normally closed contacts respectively associated with decoding relays 405 to 411, inclusive, and the still closed, cam actuated reading switch contact 540 to the reading switch clutch control relay coil 541.

It will be understood, however, that the seal-in circuit via closed contact 535–2B, line L5, is only momentary; since cam actuated, reading switch contacts 527 and 540 are both opened to interrupt the seal-in circuit, permitting immediate deenergization of read-complete relay 535 and clutch control relay 541. Upon arrival of the sprocket at the single step advancement induced by sequential energization of coils 535 and 541, the reading switch contacts 527 and 540 have already been returned to their normally closed positions indicated in FIG. 8. Thus, a circuit condition is immediately reestablished via the normally closed reading switches 527 and 540 for again effecting sequential energization of read-complete relay coil 535 and clutch control relay coil 541, for effecting the next sequential single step advancement of the read control sprocket 381, FIG. 12. As each bit of information, represented by binary coded holes on the tape 135, is read by movement of the reading pins into engagement with the coded holes, the reading pin contacts represented in FIG. 8 are actuated in code fashion to effect corresponding energization of one or another of the decoding relays 405 to 411, inclusive. The successive steps of reading a bit of coded information from the tape, and effecting the necessary sequential energization of coils 535 and 541, FIG. 8, normally occur with such rapidity that the individual stepping advancement of the tape relative to the reader in response to movement of the sprocket 381, FIG. 12, appears continuous.

As this takes place, it will be apparent that activation of one or another of the decoding relays 405 to 411, FIG. 8, effects corresponding coded operation of the associated decoding switch contacts comprising a part of the decoding matrix represented in FIG. 9, to store a single bit of information in one of the stepping switch registers. For each bit of information stored, as hereinbefore explained, the decoding relay contacts in FIG. 9 are actuated to effect corresponding energization of one or another of the select magnets 145 to 154, inclusive, depending upon the exact numerical value of that bit of information; and sequentially therewith selective energization of the particular hold magnet corresponding with that bit of information.

This entire process take place with extreme rapidity, in a manner that an entire block of information, including a sequential plurality of words of numerical data, are stored in an appropriate one of the crossbar switch registers by a relatively continuous operation of the control tape relative to the reader. As each digit, corresponding to a single bit of information on the tape, is stored in a crossbar switch register, for example the A register for the X axis, a circuit condition is established for simultaneously deenergizing the input circuit to the decoding relays 405 to 411, inclusive, FIG. 8; another circuit is established for effecting sequential energization of read-complete relay coil 535 and clutch control coil 541, FIG. 8, to effect the next single step advancement of the tape reader for reading the next bit of information; and, another circuit is established for effecting a selective single step advancement of one of the wiper arms respectively associated with stepping switch 460 or 470, respectively associated with the hold magnets for the A and B register of the X axis.

A control circuit for effecting selective stepping movement of the main stepping control switch 430 in response to energization of the tab control relay 480 upon occurrence of a tab signal, is represented along horizontal lines L80, L81, L82 and L83 inclusive in FIG. 9. As there shown, energization of tab control relay 480 in response to the tab input signal from the tape effects closure of the normally open associated contact 480–51B in line L53 connected via a normally closed contact 545–38A to the conductor 444 directly connected to energize the stepping switch coil 446, connected via conductor 443 to the energized conductor 368. Energization of the stepping switch coil 446, as represented in the diagrammatic view of the stepping switch 430, effects movement of a normally open contact 547 in line L57 associated therewith into closed position. As this occurs, and as represented in horizontal line L57 in FIG. 9, movement of stepping switch contact 547 to closed position completes a circuit via conductor 549 to energize the relay coil 545. Energization of coil 545, in turn, effects movement of normally closed associated contact in the line to the coil 446 to open position, thus effecting deenergization of the stepping switch coil 446, permitting the spring 447 to advance the wiper arms 431 to 441, inclusive, to their next indexable position. At the same time, in the event the normally open tab control contact 480–51B in horizontal line L53 is retained in closed position, a seal-in circuit to retain relay 545 energized is completed via conductor 550, and the now closed contact bar 545–38B to conductor 549 connected to momentarily seal-in the relay coil 545.

Upon resiliently biased stepping advancement of the switch 430, of course, the associated contact 547, line L57, is returned to its normally open position. Likewise, the seal-in circuit to relay coil 545 is interrupted, permitting deenergization of this relay as soon as the tab control relay 480 is deenergized. As hereinbefore explained, stepping of the select magnet control switch 430, FIG. 9, occurs only upon completion of a storage of a word of numerical data, or whenever a tab control signal occurs. It is emphasized, as hereinbefore explained, that the switch 430 is stepped to connect the decoding network to different banks of select magnets (A or B registers) respectively operative to store command data for each of the various machine functions.

Stepping of the hold magnet stepping switches 460 and 470, however, occurs each time a single digit or single bit of information is to be stored in the A or B registers associated with the X axis. The arrangement for effecting selective stepping movement of these switches is similar to that for switch 430, FIG. 9, excepting that indexable movement of the hold magnet stepping switches is controlled by energization of the read-complete relay coil 535, represented in the horizontal line L2 in FIG. 8.

Assuming now that control relay 453 in horizontal line L103 in FIG. 9 is energized to close its associated contacts represented in FIG. 10, contact 453–63AO in line L109 will be moved to closed position. Thus, whenever read-complete relay 535 in line L2, FIG. 8, is energized, associated contact 535–2C in horizontal line L109 in FIG. 10 is closed, completeing a circuit via the now closed contact 453–63AO to conductor 552 connected via normally closed contact 554–67A to energize both of the coils 556 and 557 respectively associated with stepping switches 460 and 470.

For simplicity in the drawings, the hold magnet stepping switches are represented as being controlled in unison, although only one of them is actually interconnected to selectively energize one or another of the banks of hold magnets for the A or B register. Upon energization of coil 556, a contact 560 in line L111 and pawl actuator are moved in opposition to a spring 559; at the same time, upon energization of coil 557 for stepping switch 470, a normally open contact 563 and pawl actuator are moved in opposition to a spring 572. Upon closure of stepping switch contacts 560 and 563, represented in horizontal line L112, circuits are completed therethrough to a conductor 567 connected to effect energization of relay coil 554. As this occurs, the associated normally closed contact 554–67A in line L109 is moved to open position to permit immediate deenergization of the stepping switch control coils 556 and 557. Likewise, a seal-in circuit to momentarily retain relay 554 energized is completed through closure of a normally open contact 554–67B in horizontal line L110. Upon resiliently biased stepping movement of switches 460 and 470, contacts 560 and 563 are again returned to normally open position as represented in lines L111 and L112 of FIG. 10. It will be apparent that sequential energization of read-complete relay coil 535 in line L2 of FIG. 8, as each digit or bit of information is stored in a selected crossbar register operates to effect a simultaneous single-step indexable advancement of the tape reader, as well as a stepping movement of switches 460 and 470, FIG. 10, for storing the next bit of information in its appropriate position in the crossbar storage register.

Whenever a six digit word of data is stored in the A register of the X axis, all of the hold magnets associated therewith, including magnet 175 for the last digit, are retained in energized condition. In like manner, as hereinbefore described, whenever a six digit number is stored in the B register of the X axis, all of the hold magnets including hold magnet 185 for the last digit are retained in energized condition. In order to render one of the registers available for the storage of new information, as information is being read out of the other register for effecting machine movements; the input conductors 457 and 467 to the respective wiper arms 458 and 468 are interlocked. For this reason, a normally open contact 185CA is provided in the horizontal line L129 to the wiper arm 458 of stepping switch 460. Likewise, a normally open contact 175CA, associated with the last hold magnet 175 in the A register, is interconnected in the horizontal line L131 leading to the wiper arm 468 of the B register stepping switch 470, in FIG. 10. With information in either the A or B register, as at the start of a machining cycle, it will be apparent that normally open contact 185CA, line L129 and normally open contact 175CA, line L131, precludes completion of a circuit to either wiper arm 458 or 468, respectively. To make the A register available for storing X axis information at the start of a program of machine movements, therefore, a shunt control circuit is effected around normally open contact 185CA in line L129. The shunt circuit is completed by closure of a contact 537–8A in line L128, this contact remaining closed until the first six digit number is stored in the A register for the X axis, by energization of the cycle start relay coil 537, in line L12, in FIG. 8.

As hereinbefore explained, a single step advancement of the tape reader to read each bit of information from the tape is effected by sequential energization of relays 535 and 541, the latter connected to effect engagement of the tape reader drive clutch. During this single step advancement of the tape reader, a momentary seal-in circuit is established by closure of two contacts 535–2A and 535–2B, horizontal lines L1 and L5 in FIG. 8, with the seal-in circuit being immediately interrupted by automatic operation of tape reader switches 527 and 540 to prevent movement of the reader beyond the selected single step that was initiated.

Upon starting a program of machine movements, as hereinbefore explained, the control system is activated by momentarily depressing cycle start switch 514 to effect the first sequential energization of relay coils 535 and 541. Subsequent to this, it will be apparent that separate individual signals must be provided to effect each successive single step advancement of the tape reader by reenergizing relay coils 535, 541 as each successive bit of information is read. To accomplish this, a plurality of signals, constituting in effect feedback signals from other portions of the control circuit are provided to effect the necessary sequential energization of relays 535 and 541. In addition to this, and prior to effecting energization of clutch control relay 541 for indexably moving the tape to read the next bit of information, it will likewise be apparent that certain previously stored bits of information in those portions of the control circuit between the tape reader and the ultimate storage portion for each digit in the crossbar register, must be cleared of information.

One of these signals to effect single step advancement of the reader is a disregard signal effected by closure of a normally open contact 570–24A in line L4 of FIG. 8. Another of these signals to effect single step pulsing advancement of the tape reader is a machine complete signal effected by momentary closure of a normally open contact 573–108A in line L6, or contact 573–108B in line L8. A tab signal, accomplished by energization of tab control relay coil 480, line L82 in FIG. 9, is likewise adapted to effect closure of a normally open contact 480–51A associated therewith in line L7, FIG. 8, to effect a single step pulsing movement of the tape reader.

It will be recalled that the tab signal is provided in response to an appropriate bit of information on the tape at the completion of storing a numerical word of information in an appropriate storage register, or, in response to a bit of information indicating that no information is to be stored for a function in its appropriate register. The tab signal, in other words, is always operative to direct coded information from the tape reader via the decoding relays 405 to 411, inclusive, into the appropriate crossbar switch register associated with that particular function or machine movement. In order that each single bit of information may be read by the tape, during sequential storage of the digits comprising a numerical word of information, a normally open contact 577–98A in line L8, FIG. 8, is adapted to be closed upon the completion of storing each digit of information in the appropriate portion of the crossbar register, i.e., after the corresponding hold magnet associated with that particular digit has been energized to complete the seal-in circuit for retaining that digit of information in the register for subsequent use in read-out to effect machine movements.

It will be apparent that a single step advancement of the tape reader is thus effected by closure of disregard read contact 570–24A in horizontal line L4; by momentary closure of machine complete contact 573–108A in line L6; by momentary closure of tab control contact 480–51A in line L7; or by closure of contact 577–98A in line L8 to indicate that a particular bit of information has been stored.

A disregard reading matrix is represented rightwardly from horizontal lines L35 to L45, inclusive, this circuit including various normally open and closed contacts disposed to be respectively actuated by one or another of the decoding relay coils 405 to 411, inclusive.

The arrangement is such that a circuit is completed from conductor 367 via switch contact 421S in line L37 to effect energization of the disregard relay coil 570 whenever a bit of information on the tape does not conform to the machine code. This permits storage of letter information on the tape as a visual indication to an operator for distinguishing between preceding and subsequent binary coded bits of information provided thereon.

Figure 11:
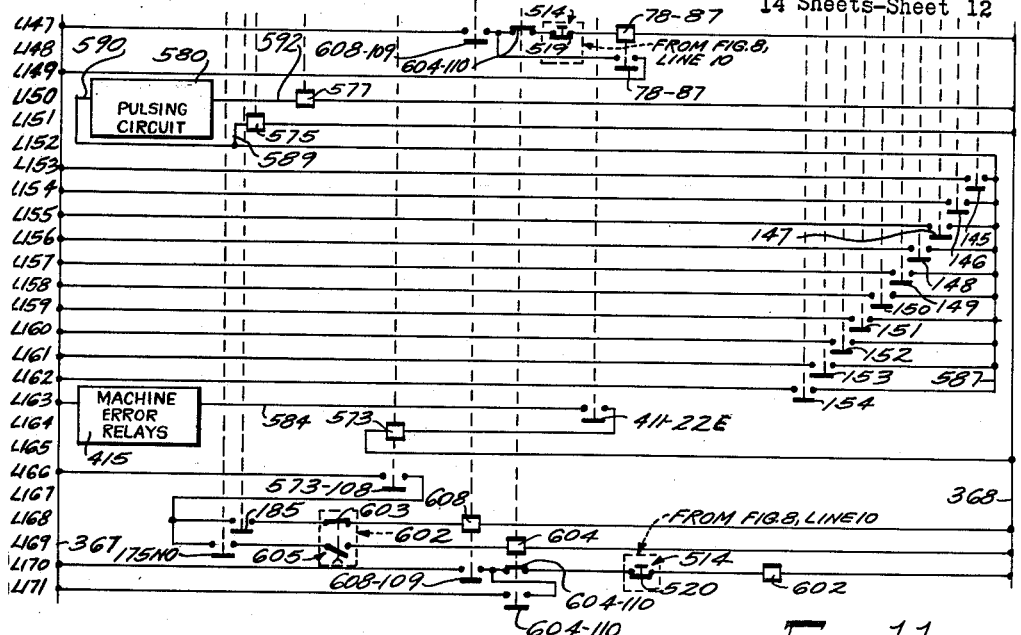

A circuit for energizing a machine complete relay coil 573 is represented along horizontal lines L163, L164 and L165 in FIG. 11. As there shown, this circuit extends along horizontal line L163 via a network 415 of machine error relays (not shown) to a conductor 584, and thence via a contact 411–22E of the end of line control relay 411, shown in horizontal line L32 in FIG. 8 to the machine complete relay coil 573. As hereinbefore explained, a machine error relay is associated with each function available through the program control system, including rectilinear movements along the X, Y or Z axes, as well as feed rate, speed rate, indexable movement of the worktable, and the tool select and tool change functions. The purpose of each of the error relays (not shown) is to indicate that the particular function being performed has been completed in accordance with the stored command signals.

Thus, upon movement of the upright 28 to the next selected position, which occurs upon arrival of the upright at that position with the output voltage from the scale winding of the lineal resolver corresponding with the reference voltage signal from the crossbar switch storage register, an associated machine error relay is actuated to complete a circuit from conductor 367, FIG. 11, via the error relays in 415 to conductor 584. Thus, as each machine movement or function is completed, an associated error relay (not shown) is actuated to closed position with the respective error relays being connected in series relationship within the box 415 in line L163, FIG. 11. Therefore, upon completion of all the machine functions and consequent actuation of the series connected relays in box 415 to closed position, the circuit is completed from energized conductor 367 to energize conductor 584 as hereinbefore explained. In the event a block of information being stored during this time is completely stored in the appropriate storage registers, the end of line relay coil 411 in line L32, FIG. 8, is energized to effect closure of associated contact 411–22E in FIG. 11. Consequently, a circuit is completed from conductor 584 via the now closed contact 411–22E to energize the machine complete relay 573.

As shown in FIG. 11, normally open contacts respectively associated with the ten select magnets for the X axis register are represented along horizontal lines 98 to 107, inclusive, interconnected in separate conductors extending between energized line 367 and a spaced apart conductor 587. Irrespective of the numerical value of the first digit to be stored, one or another of the select magnets for the X axis register is energized effecting closure of its associated normally open contact in FIG. 11, to complete a circuit from energized line 367 to conductor 587. Thereupon, a circuit is completed from conductor 587 via conductor 589 to energize an intermediate control relay 575. At the same time, upon energization of the first select magnet for the first digit of a word to be stored, a circuit is completed from energized conductor 587 to a conductor 590, extending along horizontal line L150. As the first associated select magnet for that particular digit is energized, a pulsing circuit contained within box 580 is operative to complete a circuit from energized conductor 590 to conductor 592 effecting energization of control relay 577. Energization of relay 577, in response to sequential energization of each of the select magnets, by movement of an associated contact to closed position is only momentary, however. The circuit contained within the rectangular box 580 diagrammatically illustrated in FIG. 11 is operative to provide a signal pulsing current from conductor 590 to conductor 592 to energize relay 577, as each of the select and hold magnets are energized.

Thus, relay 577 is momentarily energized after each digit is stored, after which it drops to normally deenergized position. Consequently, energization of relay 577, after a digit of information is stored, effects momentary closure of associated contact 577–98A, line L8 in FIG. 8, to effect a single step advancement of the tape reader for reading the next bit of information. As this occurs, energization of the read-complete relay 535 not only effects energization of clutch control relay 541, but also operates to move an associated normally closed contact 535–2AC, line L16, to open position, thereby clearing the decoding circuits, by interrupting the seal-in circuit to one or another of the decoding relays 405 to 411, respectively.

At the same time, momentary energization of relay 577, FIG. 11, interrupts the power supply circuit to the decoding matrix, FIG. 9, thus deenergizing the select magnets 145 to 154, inclusive, prior to reenergizing the decoding contacts for storing the proper numerical value of the next bit of information. This circuit is accomplished in part via an auxiliary control circuit represented along the lines L57, L58 and L59 in FIG. 9. The auxiliary control circuit represented in FIG. 9 extends along horizontal line L58, interconnecting energized conductor 367 via a normally closed pulsing relay contact 577–98A, and a normally closed tab control relay contact 430–51C to a conductor connected to effect energization of relay 596. As this occurs, at the start of inserting a new word of informational data into an appropriate crossbar switch register, an associated normally open contact 596–39B is moved to closed position, completing a seal-in circuit from conductor 367 via the now closed contact 596–39B, line L59, to the conductor 598 along horizontal line L60. The conductor 598, when energized, supplies input power to the decoding matrix for energizing selected ones of the select magnets 145 to 154, inclusive. Upon pulsing energization of the relay coil 577, FIG. 11, after each preceding digit of information is stored, an associated normally closed contact 575–98B, line L60 in FIG. 9, is opened to interrupt the supply current from energized conductor 598, to insure that all of the select magnets 145 to 154, inclusive, are deenergized, prior to storing the next bit or digit of information from the tape.

At the completion of storing information in all of the registers, A or B, associated with the respective machine functions, a circuit is provided to simultaneously connect all of the registers containing the latest stored information to effect the selective machine functions; and, simultaneously therewith, clear those registers containing previously stored information. Thus, those registers which had been connected to effect the previous machine functions, are reconnected to receive new information from the next block of information contained on the control tape. To simplify the description, the automatic control circuit for reconnecting the A and B registers is illustrated only with respect to the A and B registers for the X axis. It will be understood, however, that this same principle of clearing and reconnecting of the registers would normally take place after reading of a complete block of information.

Referring to FIG. 11, for example, it will now be assumed that a complete six digit word of numerical data has been stored in the A register for the X axis, thus effecting closure of a normally open contact 175–NO, contained in horzontal line L169. As hereinbefore explained, energization of the sixth hold magnet, 175 for the A register or 185 for the B register indicates a six digit word of numerical data has been stored. Closure of contact 175–NO in line L169, FIG. 11, has no immediate effect on a relay coil 604 contained in this line. However, during parallel read-out of the information from the A register, the next word of information is then stored in the B register for the X axis. As hereinbefore explained, a machine error relay associated with each machine function is actuated to closed position upon completion of that function, as schematically illustrated at 415 in FIG. 11 completing a circuit along line L163 to energize a conductor 584. Likewise, upon completion of storing a block of command signals, an end of line relay 411, FIG. 8, is energized to effect closure of normally open associated contact 411–22E, line L163, completing a circuit from energized conductor 584 to energize the relay coil 573. At the completion of storing this information, and upon energization of the machine complete relay 573, a normally open contact 573–108 in horizontal line L166 in FIG. 11 is closed, and a circuit is completed via closure of a normally open contact 185–NO, this circuit extending through an upper contact bar 603 associated with a timer actuating coil 602. This circuit continues to energize a control relay 608. As this happens, an associated normally open contact 608–109 in line L147 in FIG. 11, is closed to complete a circuit via a normally closed contact 604–110 and the normally closed contact 519 of cycle start switch 514 to energize a register control relay coil 78–87. A seal-in circuit to retain relay coil 78–87 energized is completed via an associated normally open contact in line L148. Upon energization of coil 78–87, all of the normally closed contacts represented by reference numerals having the prefix 78 in FIGS. 4 and 5 are simultaneously moved to open position. At the same time all of the normally open contacts represented in connection with the output conductors from the registers represented in FIGS. 4 and 5 are moved to closed position. For simplicity in reading the drawings, a single control relay 78–87 is represented as effecting the simultaneous reconnection of the A and B registers. Whenever the coil 78–87 is energized, the B register for the X axis will be connected to supply the necessary output reference voltage for effecting required movement along the X axis. At the same time, the A register is disconnected from the digital array and lineal resolver; thus, making the A register available for storage of the next numerical word of command information. At the same time, the A register is cleared of existing information prior to new digits of information being stored therein.

To accomplish this, energization of relay 608, line L168 of FIG. 11, as hereinbefore described, effects closure of an associated contact 608–109 in line L170 to complete a circuit via a normally closed contact 604–110 and a normally closed contact 520 associated with cycle start switch 514 to energize a timing relay coil 602. Upon energization of coil 602, an associated contact 603 in line L168 and a normally open contact 605 in line L169 in FIG. 11 are actuated. The arrangement is such that upper contact 603 is opened immediately to interrupt the circuit to relay coil 608 thus permitting movement of the associated contact 608–109, in line L147, to open position. Closure of the lower contact 605 in response to energization of the actuating coil 602 is delayed slightly, in such a manner that the sixth hold magnet 175 associated with the A register is deenergized, prior to complete closing of contact 605. Deenergization of hold magnet 175 for the A register of the X axis permits movement of an associated normally open contact 175–NO in line L169 to return to its normally open position, thus precluding completion of a circuit via the now closed switch contact 605 to coil 604.

Conversely, upon the completion of the command read-out of information from the B register, which is now connected to effect machine movements, another word of information will be stored in the A register associated with the X axis. Therefore, as this takes place, the last hold magnet associated with the A register is energized to effect closure of contact 175–NO, line L169 in FIG. 11, thereby completing a circuit via the now closed contact 605 of the timing relay to energize relay coil 604. This circuit, of course, is not completed until the machine complete signal is effected by energization of relay coil 573 to effect reclosing of associated contact 573–108 in line L166. As this occurs, energization of coil 604 effects movement of an associated contact 604–110, line L147 in FIG. 11, to open position to interrupt the seal-in circuit to the register control relay coil 78–87. Thereupon, deenergization of the coil 78–87 permits return movement of the normally closed contacts indicated by the prefix 78 in FIGS. 4 and 5 to their normally closed position, reconnecting the A register to effect machine movement. At the same time, deenergization of relay coil 78–87 permits movement of the contacts shown in FIGS. 4 and 4 by the prefix 87 to their normally open position to, in turn, disconnect the B register of the X axis from effecting machine movements.

At the very start of beginning a program of tape controlled operation, as hereinbefore explained, a six digit word of information is to be stored in the A register of the X axis as represented in FIGS. 4 and 5. As there shown, during storage of this first part of the informational data, the A register is represented as being connected via normally closed contacts to effect immediate read-out information to the digital synchro array and lineal resolver. Inasmuch as the register control relay coil 78–87, line L147 in FIG. 11, is deenergized at this time, all contacts associated with the A register and preceded by the prefix 78 in FIGS. 4 and 5 are in normally closed position. During this particular condition of operation, i.e., storing the first input information, the transformer networks 141 in FIG. 4 and 142 in FIG. 5 are not energized. This is to prevent immediate read-out of information as it is being stored.

Inasmuch as the illustrative embodiment is made in connection with the A and B registers for the X axis, it will be apparent that this same condition will exist during storage of the entire first line of information. Thus, to preclude immediate read-out during storage of the initial input information, an auxiliary control circuit is provided along the lines L46, L47, L48, and L49 in FIG. 8. As there shown, energization of the last hold magnet 175, indicating that a complete six digit number has been stored, effects closure of a normally open contact 175–NO in line L46 to complete a circuit from the energized line 367 to energize a relay coil 610, this circuit being completed to energized conductor 368. Energization of coil 610, upon completion of storing the first portion of the word of input information, effects closure of associated normally open contact 610–32 in horizontal line L48 in FIG. 8 interconnected along to effect energization of the 400 cycle transformer network 141 and the 10 kc. source 142. As this occurs, since the first portion of information is stored and the normally closed contacts indicated by the prefix 78 in FIGS. 4 and 5 are in closed position, a read-out of this information is effected to provide immediate machine movements in response to the first information stored. Relay 610 is thus sealed-in until automatic programming is completed, or switch TSS in line L46 is depressed.

It is to be understood that the auxiliary control circuit described and represented along lines L46, L47, L48 and L49 is for illustrative purposes only to indicate the method of providing appropriate read-out after the first information is stored. It will be further apparent that energization of coil 610 actually would take place after storage of the first complete line of information of the tape. Once the first line or block of information has been stored in the appropriate crossbar registers, however, relay coil 610 is sealed in energized closed position for the balance of programmed machining operations. After storage of the initial portion of the information, the interconnection of the registers, in a manner that the appropriate register is connected to effect machine movements and the other registers are connected to receive information to be stored, is under control of the register control relay 78–87 shown in line L147 of FIG. 11 as hereinbefore explained.

To effect selective indexable movement of the work supporting table 46 shown in the block diagram in FIG. 2, a signal is simultaneously transmitted from an appropriate one of the crossbar registers via conductor 101T to actuate a sequencing switching circuit 612 shown in FIG. 14. The general mode of operation and interconnection of the various parts of the index table for effecting release of the clamp mechanism during indexable movement is more fully shown and described in the copending patent application to Brainard et al., Serial No. 745,187, filed June 27, 1958 and entitled "Machine Tool and Pallet Clamping Mechanism," and which issued as Patent No. 3,054,333 on September 18, 1962.

Prior to effecting indexable movement of the table 46, it is necessary that the table be first elevated into unclamped position as shown, after which it is moved to the selected position and reclamped. The purpose of the sequencing circuit 612 represented in FIG. 14 is to move the index table 46 to unclamped position as shown, and reclamp the table to the support 622 integrally formed with the frame after indexable movement has been effected. As shown in FIG. 14, there is provided a source of hydraulic fluid 624 that is withdrawn by a motor driven pump and supplied to a main pressure supply line 628. Prior to indexing, sequencing circuit 612 is operative to activate a solenoid 636 for actuating a control valve 635 for moving the table 46 upwardly to unclamped position. As this occurs, another valve 625 respectively under the control of solenoid coils 626 and 627 is normally retained in position to maintain the work pallet 44 in clamping engagement to the upper surface of the worktable 46. To effect indexable movement of the table 46, the power actuator 115D is connected to drive a gear 617 engaging a gear 618 integrally formed with the table 46. Upon arrival of the table 46 at its next selected position of indexable adjustment, valve 635 is again actuated by the sequencing circuit 612 to return table 46 into clamping engagement with the support 622. Valve 630 responsive to coil 631 is operative in connection with valve 625 for controlling clamping engagement of the work supporting pallet 44. The sequencing circuit 612, FIG. 14, for controlling the operation of the valve control solenoids thereshown to effect unclamping and reclamping of the table 46 operates in a manner fully shown and described in the aforementioned Brainard et al. Patent No. 3,054,333.

The tool select circuit is similar to that for effecting indexable movement of the worktable 46, as represented in schematic form in the block diagram, FIG. 2. Thus, information for effecting a selection of a tool during a machining operation is supplied from one or another of the appropriate tool select storage registers, FIG. 2, the output being connected via a digital synchro array 105D, FIG. 15, such as the arrays 105 represented for the various axes of movement in FIG. 2, and fed to a mixer discriminator 107D and thence transmitted to activate an error operator 109D connected to actuate a servo amplifier 112D for driving the power actuator 115D as hereinbefore described. Energization of the power actuator 115D in turn is connected to rotate a gear 640 engaging a driven gear 641 carried by the tool change drum 40 to effect movement of the tool change drum 40 for positioning a selected tool in the appropriate tool change station, as represented at 47 in FIG. 16. Arrival of the tool storage index drum 40 to position an appropriate tool in the tool change station is determined by the co-action of a slider 120D cooperating with the winding in a circular scale 119D, these two elements comprising a resolver 121D. Upon arrival of the tool storage drum for positioning a preselected tool in the appropriate tool change ready station 47, the machine is conditioned for subsequent changing of a tool, this operation being effected by the tool change mechanism schematically illustrated in FIG. 17.

Both the tool change mechanism and a form of index control for effecting selective indexable movement of the tool storage drum 40 are fully shown and disclosed in copending patent applications by Brainard et al., Serial No. 744,976, filed June 27, 1958, and entitled "Machine Tool with a Mechanical Cutting Tool Changer"; which issued as Patent No. 3,052,011; and, to Brainard et al. Serial No. 777,122, filed November 28, 1958, and entitled "Shuttle Operated Tape Controlled Machine Tool" which issued as Patent No. 3,099,873 on August 6, 1963.

As therein described and shown, one of the principal advantages of the tool change mechanism 41, FIG. 17, is to provide a simultaneous interchange of a selected tool from a tool change station with a tool carried by the tool spindle, in a manner that a newly selected tool is inserted in the tool spindle and the tool from the tool spindle is reinserted in the same storage socket. One of the principal advantages of the present invention is that the selection of the next required tool to be used in effected prior to and independently of operation of the tool change mechanism 41 to insert a newly selected tool in the tool spindle.

As schematically represented in FIG. 2, control of indexing the table 46 is effected by common voltages emanating from A or B registers that are alternately preset by information from tab signal indicated as tab 8, and originating from conductor 69 from the decoding network. In a similar manner, information from the tape reader 58 activates the decoding network 59, the latter being schematically indicated as being connectable via conductor 67 and tab 6 to preset command voltages in the A or B tool select cross bar storage registers. Command voltages for tool select or table index are preset in the appropriate associated cross bar switch storage registers in a manner identical to that hereinbefore described with reference to the X axis, and illustrated in FIGS. 4, 5 and 6. In all cases the tab sequence arrangement, schematically indicated as tabs 1 to 8 in FIG. 2, is a system for successively connecting the decoding network 59 to appropriate pairs of cross bar switch storage registers. This insures transmission of the appropriate block of information from the tape into a portion of the cross bar register associated with that particular machine function. As hereinbefore described with reference to FIGS. 8 to 11 inclusive, the sequential change from registers from one function to registers for the next machine function is initiated by energization of the tab sequence relay 480 in response to a tab signal on the control tape, as hereinbefore explained with reference to FIG. 3. Likewise, as hereinbefore explained, command reference voltages are provided for all machine functions excepting the auxiliary functions which are simple switching functions that are stored in an appropriate storage register (A or B) to initiate the proper function, for example, tool change, as other auxiliary command information is stored in the associated register from tab 7.

As illustrated in FIG. 16, the tool spindle 38 is represented as carrying a cutting tool 42 and a tool 48 has been moved into tool changing position in parallelism with the tool spindle 38. As represented in FIG. 17 by broken lines, the tool change arm 674 has operated to withdraw the tools 42 and 48 from their original positions shown in FIG. 16, and has rotated them a sufficient distance to position them for reinsertion in the collet clamps mechanism provided in tool spindle 38 and in the storage socket 680.

As hereinbefore described with reference to FIG. 2, the auxiliary function conductor extending from the decoding network is operative to transmit an appropriate tool select signal to one or another of the associated A or B storage registers. Conductors 683 and 684 are connected to transmit the storage signal from one or another of the registers to a conductor 685, FIG. 17, connected to activate a tool change sequencing circuit 690. With the tool change drum 40 originally positioned to advance a preselected tool, No. 48, to the tool change ready station; control valve 545 is responsive to solenoid 646 controlled by circuit 690 to posivitely retain the index drum 40 in preselected position. In response to the tool change signal from conductor 685, a control valve 649, responsive to control solenoid 650 and 651, is operative to rotate a shaft 675 for moving tool storage socket 680 into parallelism with the tool spindle 38; and, simultaneously therewith, pivoting the tool change arm support member 672 from parked position to a forward operating position. The shaft 675 is interconnected via a linkage 648 to effect pivotal movement of the tool change arm support 672 in coordinated relationship with tool storage socket 680. As this occurs, another control valve 654 responsive to solenoid 655 under control of sequencing circuit 690, is operative to release a collet clamp mechanism 702 carried by the rotatable tool spindle 38. Next, coordinately operative control valves 657 and 660, respectively responsive to solenoids 658 and 661, are disposed to interconnect pressure fluid from the sump 700 with a piston controlled mechanism to effect counterclockwise rotation of the tool change arm 674 in a manner that oppositely disposed semi-circular openings presented by offset portions thereof respectively engage a tool 48 carried by the storage socket 680, and tool 42 carried by tool spindle 38. Subsequent to this, control valve 667, responsive to solenoids 668 and 669, are operative to move the tool change arm 674 forwardly for retracting the respective tools from the storage socket 680 and tool spindle 38. After this, valves 657, 660 and 663 are coordinately operative to effect rotational movement of the tool change arm 674, to the dotted line position indicated in FIG. 17, with the tools in interchanged position for reinsertion in the storage socket 680 and tool spindle 38 respectively. Thereupon, control valve 667 is again operative to insert the interchange tools respectively in the tool spindle 38 and storage socket 680. A substantially reversed cycle of coordinate operation of the various control valves is then operative to (1) return the tool change arm 674 to its starting position relative to support 672; (2) reengage the collet clamp 702 for clamping the tool 48; (3) actuating the shaft 675 for pivotally returning the support member 672 to parked position and pivoting the storage socket 680 to its original starting position in parallelism with the axis of the index storage drum 40. After this cycle of operation has been completed by the tool changer sequencing circuit 690, the preselected tool 48 is then securely clamped within the tool spindle 38, and the original tool 42 carried by the spindle is positioned in the storage socket 680, returned to starting position. After this, the tool change drum 40 may then be selectively indexed for positioning the next selected tool in a tool change ready station during a subsequent machining operation. The details of operating the tool changer sequencing circuit 690 for operating the various valve control solenoids in FIG. 17 are shown and described in the aforementioned copending patent applications.

From the foregoing detailed explanation of the operation of the automatic machine tool control system herein set forth as a practical embodiment of the present invention, it will be apparent that there has been provided a greatly improved machine tool control system operative to control a preselected program of machining movements or functions in any predetermined sequence. The improved program control system comprises means for transmitting serial input information to a plurality of storage registers, with a pair of registers being available to receive serial input information from a record of programmed data. Each pair of the storage registers respectively associated with each machine function or movement is alternately connectable to receive information from the record, at the same time the other of the registers associated with that function is connectable to effect the required machine movements or functions in response to previously stored information. As certain of the machine movements or functions are being performed, certain other of the machine members are retained dynamically in preselected positions in response to data stored in one or another of the associated storage registers. Means are provided for transmitting each word of numerical data into appropriate registers that are alternately connectable to receive the data being stored, and effect a machine function from data previously stored. Input information from a record is transmitted to one or another of the storage registers associated with each function in serial input form, with an automatic connection of the register receiving information being then effected to effect a parallel read-out of the stored data for performing the particular machine function required. In the preferred embodiment herein set forth, the storage registers adapted to receive data function not only as storage media, but also as translation devices for converting decimal input information into an analogue, binary or decimal output, as required for subsequently effecting the particular function called for by the record. By retaining certain of the machine members in preselected positions under continuous control of data stored in a register, an extremely high degree of accuracy in effecting machining operations is provided. Although crossbar switches have been herein represented as a preferred means of storing and disseminating data previously stored, it will be readily apparent that other forms of switching matrices may be utilized with equal effectiveness. The entire programmed control system for effecting selected sequential series of machining operations and functions is adapted to automatically condition one function for being subsequently performed during the performance of another machine function. For example, a preselected tool is moved into a tool change ready station during one machine function, positioning the preselected tool for a subsequent automatic interchange with a tool carried by the machine spindle.

Although the illustrative embodiments of the invention have been described in considerable detail for the purpose of fully disclosing a practical operative structure and control system by means of which the invention may be practiced, it is to be understood that the particular control system and apparatus herein described are intended to be illustrative only, and that the various novel characteristics of the invention may be incorporated in other structural forms and types of control systems without departing from the spirit and scope of the invention as defined in the subjoined claims.

The principles of this invention having now been fully explained in connection with the foregoing description, I hereby claim as my invention:

1. In an automatic control system for a machine tool having a plurality of movable members, a source of reference voltage comprising energized position control transformers, a pair of selectively actuatable crossbar switches respectively comprising storage registers adapted to be individually preset for storing digitized input control information in the form of predetermined reference command voltages from said source of reference voltage, a source of digitized input data comprising serial input information for directing a predetermined sequence of positionally controlled machine movements, a reader connected to be actuated by said digitized input data, control means operative to connect one of said crossbar switches to be actuated by said reader for storing predetermined reference control voltages from said source and to disconnect the other of said crossbar switches from said reader, said control means being simultaneously operative to connect whichever crossbar switch is disconnected from said reader to transmit output command voltage signals previously stored therein, a plurality of motion translators connected to be activated by command voltage signals transmitted from whichever of said crossbar switches that is disconnected from said reader, and means for actuating said control means to interchange the operation of said crossbar switches whereby each of said crossbar switches is alternately connected to store command voltage signals and to transmit output command voltage signals previously and respectively stored in one of said switches.

2. In an automatic control system for a machine tool, a frame, a plurality of support members slidably carried by said frame for movement to predetermined selected positions, a plurality of power driven translators respectively connected to move said support members, a pair of crossbar switches alternately connected to transmit stored numerical data for actuating said power driven translators for moving said support members predetermined distances according to the numerical data, a source of numerical control data including a reader operatively connected to activate whichever of said crossbar switches is not connected to actuate said translators for storing digitized control signals for subsequently controlling movement of said translators, auxiliary control means operatively disposed to connect one of said crossbar switches to be activated by said reader and the other of said crossbar switches to actuate said power driven translators, said auxiliary control means being reversibly operative to reconnect said crossbar switches in a manner that one of said crossbar switches is connected to actuate said translators at the same time the other of said switches is being connected to be activated by said numerical control data.

3. In a control system for a machine tool, a record providing a plurality of signals operative to effect a predetermined program of machining operations, reading means operable to read the signals from said record, means for storing information from said reading means including a pair of crossbar switches comprising a dual register, a tool spindle and a work support carried for relative movement in a plurality of directions, a plurality of power driven translators connected to effect selective relative movement between said spindle and said work support control means operable to connect one of said crossbar switches to be preset by signals from said reading means for storing signals from said record and simultaneously to connect the other of said crossbar switches to transmit previously stored signals for activating said power driven translators for performing a preselected machining operation, and timing means responsive to completion of one machining operation in response to one crossbar switch and completion of storage of signals in the other crossbar switch, said timing means being operatively connected to reverse the connection of said crossbar switches, whereby one of said crossbar switches is connected to be preset by said reading means for storing signals at the same time the other of said crossbar switches is connected to transmit previously stored signals for activating said power driven translators.

4. In an automatic control system for a machine tool, a frame, a plurality of support members carried by said frame for selective movement to preselected positions, a plurality of power driven motion translators respectively connected to move said support members, a source of digitized control information, a reader connected to receive information from said source of digitized input information, a pair of crossbar switches constituting separate storage registers alternately connectable to be activated by said reader and to retain information for subsequently effecting movement of said members, auxiliary control means automatically operative to connect one of said crossbar registers to be activated by said reader in accordance with digitized control information from said source and being simultaneously operative to connect the other of said crossbar registers to activate said power driven motion translators for moving said support members predetermined distances to preselected positions, and actuating means responsive to arrival of said supports at said preselected positions and to completion of the storage of information in whichever of said crossbar storage register is connected to be activated by said reader, said actuating means being connected to activate said auxiliary control means for interchanging the operating function of said crossbar registers.

5. In a machine tool control system adapted to control a machine tool for performing a plurality of functions, a source of numerical data comprising a preselected record of functions to be performed in a manner that said record presents sequentially spaced apart blocks of numerical instructions with the different blocks of instructions respectively adapted to control different functions, said record being provided with a plurality of identical tab signals with a tab signal preceding each block of numerical command data, a pair of storage registers respectively comprising storage register portions and being alternately presettable in response to serial input information from said data source for storing data to effect a subsequent function, each of said registers being subsequently operative to effect a parallel readout of stored data, a tab control device responsive to a tab signal during storage for directing the immediately following block of numerical instructions to store command data into an appropriate one of said storage register portions, and power actuating servos responsive to data stored in one of said registers for performing the machine functions selected at the same time the other of said registers is being preset by subsequent serial input data from said source.

6. In combination with a machine tool having a plurality of different servo controlled power actuating means respectively operative to perform different preselected machine functions, first presettable storage register means connected to transmit command instructions in parallel for operating said servo controlled power actuating means to perform selected functions, second presettable storage register means connected to be preset to store command instructions for effecting subsequent operation of said servo controlled power actuating means, a record of command signals in serial form including record reading means connected to preset said second storage register means for storing command instructions during the time said first storage register means is connected to provide parallel output command instructions for operating said power actuating means, and control means operated by completion of operation of said servo controlled actuating means in response to stored command instructions from one of said storage register means and by completion of presetting the other of said storage register means in response to storing of serial command instructions from said record, and switching means actuated by operation of said control means for interchanging the operation of said storage register means.

7. In a machine tool having a plurality of relatively movable members operable to perform different functions, a plurality of servo controlled power drive means respectively actuatable to operate said members in accordance with voltage ratios corresponding to numerical command signals, a record of numerical command signals in serial form for effecting subsequent actuation of said servo controlled power drive means, a source of reference voltage, a plurality of presettable storage registers respectively adapted to constitute a source of voltage command signals for respectively actuating an operatively associated one of said servo-controlled power actuating means, each of said storage registers comprising one storage register portion which is connected to be preset by serial numerical command signals from said tape for subsequently producing predetermined voltage command signals and a second storage register portion which is connected to transmit previously preset voltage command signals for actuating an operatively associated one of said servo-controlled power drive means, reading means operative to transmit numerical command signals from said tape for sequentially presetting said storage registers to respectively and subsequently provide correspondingly different voltage command signals from said tape at the same time said storage registers are connected to provide different parallel voltage output command signals corresponding to numerically preset voltage command signals from said tape for actuating said respectively associated servo controlled power drive means; and, control means actuatable in response to completion of operation of said servo controlled power drive means in response to stored voltage command signals from said registers and to completion of storing additional numerical control signals from said tape for presetting said storage registers to store voltage command signals for effecting subsequent operation of said servo controlled power drive means, said control means being operatively connected when actuated to respectively interchange the operation of said register portions in such a manner that said registers are then operatively connected to effect the subsequent operation of said servo controlled power drive means in response to voltage command signals corresponding to the last stored numerical command signals and simultaneously therewith to operate said reading means for transmitting numerical command signals from said tape for again presetting said storage registers to effect the next operation of said servo controlled power drive means in response to those voltage command signals last stored in said registers.

8. In a machine tool having a plurality of elements operatively connected to be actuated according to numercial command instructions, a plurality of power actuating means respectively connected to move said elements to positions corresponding to predetermined reference command voltages, first storage register means connected to transmit stored command voltages in parallel form for activating said power actuating means to move said elements, second storage register means connected to be preset for storing different reference command voltages to effect subsequent actuation of said power actuating means during the period said first storage register means are connected to actuate said power actuating means, a record of numerical command instructions in serial form including cooperating record reading means operative to preset said second storage register means for providing predetermined voltage command signals, and control means actuated by storage of voltage command signals in one of said register means and completion of element movement in response to the other of said register means, said control means being operable when actuated to interchange the operation of said registers.

9. In a machine tool having a plurality of movable members respectively operative to perform different functions; a plurality of selectively actuatable servo controlled power actuating means respectively connected to operate said members in accordance with different numerical command signals; a control tape provided with serially disposed numerical command signals for operating said members; a plurality of storage registers respectively and individually associated with said servo controlled power actuating means with each of said registers comprising a pair of register portions for selectively actuating an associated one of said servo controlled power means, one of said register portions being disposed to be preset for storing numerical command signals at the same time the other of said register portions of the same register is connected to transmit previously stored numerical command signals for actuating said associated one of said servo controlled power means; and, tape reading means operative to transmit serial input command signals from said tape to sequentially preset said storage registers at the same time said storage registers are connected to transmit previously stored numerical command signals to selectively actuate said respectively associated servo controlled power drive means.

10. In a machine tool having a plurality of relatively movable members, a record of numerical command data in serial form for operating said machine to effect a predetermined program of positional movements of said members, a first storage register comprising a plurality of first storage register portions adapted to be preset by numerical command data from said record for storing command signals for effecting subsequent movement of said members to predetermined positions, a second storage register comprising a plurality of second storage register portions adapted to transmit previously stored command signals for effecting positional movement of said members, reading means operative to transmit information in serial form from said record for sequentially presetting said first register portions to provide a source of parallel command signals for effecting subsequent positional movement of said members at the same time said second storage register comprising said second storage register portions are connected to transmit previously stored command signals in parallel form for effecting movement of said members to predetermined positions and for dynamically retaining said members in the required positions, a plurality of servo controlled power drive means connected to move said members to positions determined by numerical command signals stored in said second storage register portions; and, means actuated upon both completion of the presetting of said first storage register portions and arrival of said members at positions determined by numerical command signals stored in said second storage register portions, said actuating means being operative upon both signal storage completion and member movement completion for initiating operation of said servo controlled power drive means to move said members to positions corresponding to numerical command signals stored in said first storage register portions, whereby member movement is effected by parallel command signals during the time serial command signals from said record are stored for effecting subsequent selected servo controlled movement of said members.

11. In a machine tool having a plurality of relatively movable members, a plurality of separate servo controlled power actuating means connected to move said members to positions corresponding to numerical command signals, one presettable storage register operatively connected to transmit a plurality of stored numerical command signals in parallel for operating said plurality of servo controlled power actuating means for moving said members, another presettable storage register connected to be preset for storing a plurality of numerical command signals for effecting subsequent operation of said plurality of servo controlled power actuating means, a record of numerical command signals including reading means operatively connected to provide serial numerical command signals for presetting said other storage register, and means operative to connect said one storage register to provide a plurality of parallel stored command signals for operating said plurality of servo controlled power actuating means and to connect said other storage register to be preset by serial command instructions from said record for effecting subsequent operation of said servo controlled power actuating means.

12. In a machine tool, a plurality of servo controlled power actuators connected to perform different machine functions according to different numerical command signals, a plurality of machine members respectively connected to be moved by said power actuators, separate storage registers alternately connectable to transmit previously stored parallel output command signals for controlling the operation of said servo controlled power actuators at the same time the other of said storage registers is connected to be preset by serial input signals from a record of serial command signals, a record of serial command signals including cooperating reading means connected to preset whichever of said storage registers that is not connected to operate said plurality of servo controlled power actuating means for storing a next series of output command signals, and storage register control means connected to be actuated by completion of operation of said servo controlled power actuators by command signals from one storage register and by completion of storage of serial input command signals from said record in the other of said storage registers, said storage register control means being operative when actuated to interchange the operative connection of said storage registers, whereby one of said storage registers is continuously connected to operate said servo controlled power actuating means and the other of said storage registers is connected to be preset by serial input information from said record.

13. In a machine tool adapted to perform a plurality of different functions in coordinated relationship and including a plurality of separate selectively operative servo controlled power drive means for effecting the functions to be performed; a source of command voltage; a first presettable storage register preset to provide a plurality of parallel output voltage command signals from said source for operating said power drive means to effect preselected functions; a second presettable storage register sequentiably presettable to store different voltage command signals from said source during the time said power drive means are operated by previously stored voltage command signals from said first storage register; a record of serial command signals including reading means operative to preset said second storage register for supplying different parallel voltage output command signals for effecting subsequent operation of said power drive means; and means for connecting said power drive means to be actuated in accordance with parallel voltage command signals stored in said second storage register including means for cancelling the voltage command signals originally stored in said first storage register and for connecting said record including said reading means for presetting said first storage register to store different voltage command signals, whereby said power drive means are operated by stored parallel voltage command signals at the same time serial command signals are being stored.

14. In combination with a machine tool having a plurality of relatively movable members including respectively associated separate servo controlled power drive means therefor, a first storage register adapted to provide a plurality of previously stored different parallel voltage command output signals corresponding to numerical input signals for controlling the operation of said power drive means, a second storage register connected to be electrically preset by serial input information to subsequently provide different voltage output command signals during the time said power drive means are operated by previously stored voltage command signals from said first storage register, and a serial record of command signals including reading means connected to preset said second storage register for supplying voltage output command signals for effecting subsequent operation of said servo controlled power drive means.

15. In a machine tool having a plurality of relatively movable members, a plurality of servo controlled power drive means respectively connected to move said members to predetermined positions determined by voltage command signals corresponding to digital command instructions, a source of reference voltage, a first presettable storage register operative to transmit voltage command signals from said source in parallel for operating said plurality of servo controlled power drive means to move said associated members to predetermined positions and to dynamically retain them in those positions, a second presettable storage register connected to be preset for supplying parallel voltage command signals from said source for effecting subsequent positionally controlled operation of said servo controlled power drive means, a record of numerical command instructions in serial form including record reading means adapted to transmit serial numerical command instructions to preset said second storage register during the interval said first preset storage register is connected to control the operation of said servo controlled power drive means, and storage register control means actuatable in response to completion of operation of said servo controlled power drive means in response to stored command signals and presetting of said second presettable storage register, in response to signals from said tape, said control means being operable to interchange the operation of said storage registers.

16. In a machine tool having a plurality of relatively movable members; a plurality of servo controlled power drive means respectively connected to move said members in accordance with predetermined voltage command signals; a plurality of positioning control means respectively connected to be driven by said members for controlling the operation of said power drive means in accordance with predetermined voltage command signals respectively supplied to control an associated one of said power drive means; a control tape provided with serially disposed numerical command input signals for subsequently controlling the operation of said power driven translating means; a plurality of storage registers respectively associated with said separate power drive means and being individually presettable for storing different voltage command signals corresponding to different command signals from said tape; each of said storage registers respectively comprising a pair of storage register portions with one of said register portions being connected to operate an associated one of said power drive means at the same time the other of said register portions of the same one of said registers is connected to be preset by serial input command signals from said tape; tape reading means operatively connected to transmit serial command signals from said tape for sequentially presetting said storage registers for effecting subsequent operation of said registers at the same time said storage registers are connected to transmit previously stored voltage command signals in parallel form for operating said respectively associated servo controlled power drive means; machine complete control means actuatable in response to completion of operation of said power drive means as determined by the response of said respectively associated position indicating means to said parallel voltage command signals stored in said registers; read complete control means actuatable in response to completion of sequential presetting of said storage registers; and register control means operative upon actuation of both said machine complete control means and said read complete control means and being adapted to connect said registers for transmitting the last stored voltage command signals for operating said power drive means and simultaneously therewith for actuating said tape reading means for transmitting the next serial command signals from said tape to again preset said storage registers for subsequently providing different output voltage command signals.

17. In a machine tool having a movable member operable to perform a function; servo controlled power drive means connected to operate said movable member for performing the function in accordance with predetermined voltage command signals; a control tape provided with input command signals in serial form for effecting subsequent operation of said member; a source of reference voltage connectable to provide a voltage output signal corresponding to a numerical command signal from said tape for effecting selected operation of said servo controlled power drive means; a storage register operative to store voltage command signals from said source in accordance with command signals from said tape; said storage register comprising one register portion adapted to be preset by command signals from said tape for providing preselected output voltage signals from said source to effect subsequent operation of said servo controlled power drive means, and a second register portion preset to provide previously stored voltage signals from said source for operating said servo controlled power drive means; tape reading means operative to transmit command signals from said tape for presetting said storage register at the same time said storage register is connected to provide output voltage command signals to operate said servo controlled power drive means; and register control means actuatable in response to both completion of storage of voltage control signals in said register for effecting subsequent operation of said power drive means and to completion of operation of said power drive means in response to previously stored voltage command signals from said storage register, said register control means being operative when actuated to reconnect said storage register in such a manner as to transmit the last storage voltage command signals from said register to operate said power drive means and simultaneously therewith to actuate said reading means to transmit command signals from said tape for presetting said storage register to provide voltage command signals for effecting subsequent operation of said power drive means.

18. In a machine tool having a plurality of relatively movable members respectively operative to perform different functions in any predetermined sequence; a plurality of power drive means respectively connected to operate said members for performing the required functions in accordance with numerical command signals; a record of serial command signals constituting a source of command signals for effecting subsequent operation of said power drive means; a plurality of presettable storage registers respectively and operatively associated with said power drive means, each of said storage registers comprising a pair of operatively associated storage register portions so arranged that one of said register portions is connected to be preset by serial command signals from said record at the same time the other of said associated register portions is connected to transmit previously stored numerical command signals for operating an associated one of said power drive means; and reading means associated with said record to transmit serial command signals from said record for sequentially presetting said storage registers for storing the next series of numerical command signals to effect subsequent control of said power drive means at the same time said storage registers are connected to transmit previously stored command signals in parallel form for simultaneously operating said plurality of power drive means.

19. In a machine tool having a plurality of relatively movable members; a record of numerical command data for controlling the positional movement of said members, a plurality of servo controlled power drive means respectively connected to move said members to predetermined positions respectively defined by numerical command input signals, different measuring control means responsive to movement of each of said members for indicating the position of that member, separate feedback control means responsive to each of said measuring control means connected to activate an associated one of said servo controlled power drive means for moving an associated one of said members to the position defined by numerical command input signals, a first presettable storage register comprising a plurality of separate register portions respectively adapted to store separate numerical input command signals corresponding ot numerical command data on said record for moving said members to predetermined positions, said first storage register being connected to transmit previously stored numerical input command signals in parallel for actuating said servo controlled power drive means for moving said members to predetermined positions, a second presettable storage register comprising a plurality of separate storage register portions adapted to be preset to store command signals for effecting subsequent operation of said power drive means during the time said first register is connected to actuate said servo controlled power drive means; and, reading means including decoding means connected to transmit serial numerical command data from said record for presetting said second storage register for providing a source of parallel numerical input command signals to effect subsequent movement of said members to a next required series of positions.

20. In a machine tool, selectively operable power driven actuators connected to perform a plurality of different machine functions, a pair of presettable storage registers respectively comprising a plurality of alternately presettable storage register portions with certain of said register portions being individually presettable to provide analogue output signals in the form of reference voltage command signals and certain other of said register portions being presettable to provide predetermined coded output signals for operating correspondingly associated ones of said power actuators, a record of digital command instructions including reading means operatively connected to preset certain of said storage register portions for supplying analogue output command signals and to preset certain other of said register portions to supply coded output signals at the same time other previously preset ones of said register portions are connected to selectively actuate associated ones of said power driven actuators for performing machine functions in accordance with the preset output command signals, and means for interchanging the operation of said presettable storage registers, said interchanging means being actuatable upon both completion of the presetting of said storage register portions which are connected to be preset by digital input data and by completion of the functions effected by said storage register portions which are connected to operate said power driven actuators, whereby some of said storage register portions are connected to be preset by digital command instructions from said record at the same time other previously preset ones of said storage register portions are connected to effect selective actuation of correspondingly associated ones of said power actuators.

References Cited in the file of this patent
UNITED STATES PATENTS

| | | |
|---|---|---|
| 2,690,913 | Rabinow | Oct. 5, 1954 |
| 2,710,934 | Senn | June 14, 1955 |
| 2,843,811 | Tripp | July 15, 1958 |
| 2,875,390 | Tripp | Feb. 24, 1959 |
| 3,052,011 | Brainard et al. | Sept. 4, 1962 |